US010786763B2

(12) United States Patent
Bradt

(10) Patent No.: US 10,786,763 B2
(45) Date of Patent: Sep. 29, 2020

(54) FILTER FOR EXTRUDER PRESS

(71) Applicant: GreenField Specialty Alcohols Inc., Toronto (CA)

(72) Inventor: Christopher Bruce Bradt, LaSalle (CA)

(73) Assignee: GREENFIELD SPECIALTY ALCOHOLS INC., Toronto (CA)

( * ) Notice: Subject to any disclaimer, the term of this patent is extended or adjusted under 35 U.S.C. 154(b) by 597 days.

(21) Appl. No.: 15/497,340

(22) Filed: Apr. 26, 2017

(65) Prior Publication Data

US 2017/0312658 A1    Nov. 2, 2017

Related U.S. Application Data

(60) Provisional application No. 62/330,444, filed on May 2, 2016.

(51) Int. Cl.
| *B30B 9/12* | (2006.01) |
| *B30B 9/16* | (2006.01) |
| *B01D 25/12* | (2006.01) |
| *B30B 9/26* | (2006.01) |
| *B01D 25/32* | (2006.01) |

(52) U.S. Cl.
CPC ........... *B01D 25/12* (2013.01); *B01D 25/325* (2013.01); *B30B 9/12* (2013.01); *B30B 9/124* (2013.01); *B30B 9/16* (2013.01); *B30B 9/26* (2013.01); *B30B 9/262* (2013.01)

(58) Field of Classification Search
CPC .. B30B 9/12; B30B 9/16; B30B 9/262; B30B 9/26; B30B 9/124; B01D 25/112; B01D 25/325

USPC ......................................... 100/117; 210/415
See application file for complete search history.

(56) References Cited

U.S. PATENT DOCUMENTS

| 1,102,301 A | 7/1914 | Sizer |
| 1,722,814 A | 7/1929 | Meakin |
| 2,455,486 A | 12/1948 | Hicks |
| 3,065,689 A | 11/1962 | Gueytron |

(Continued)

FOREIGN PATENT DOCUMENTS

| CA | 1070646 A | 1/1980 |
| CA | 1127552 A | 7/1982 |

(Continued)

OTHER PUBLICATIONS

International Patent Application No. PCT/CA2017/050509, International Preliminary Report on Patentability dated Feb. 20, 2018.

(Continued)

*Primary Examiner* — Thomas M Lithgow
(74) *Attorney, Agent, or Firm* — Borden Ladner Gervals LLP; Mark F. Vickers

(57) ABSTRACT

A solid/fluid separation module and press enables treatment of solids with enclosed fluids to generate a filtered mass having a solids content above 50%. A split filter module with first and second filter blocks clamped together for forming barrel sections or filtering sections is disclosed for use in a solid/fluid separating device including a barrel and a conveyor screw in the barrel. The split filter module permits replacement, maintenance, or repair of the filter blocks without disassembly or the separating device, or removal of the conveyor screws.

23 Claims, 25 Drawing Sheets

(56) References Cited

U.S. PATENT DOCUMENTS

| | | | |
|---|---|---|---|
| 3,141,845 | A | 7/1964 | Nadherny |
| 3,230,865 | A | 1/1966 | Dietmar et al. |
| 3,578,176 | A | 5/1971 | Cuyler |
| 3,807,298 | A | 4/1974 | Luke et al. |
| 4,003,304 | A | 1/1977 | Reinhall |
| 4,025,001 | A | 5/1977 | Yarem et al. |
| 4,069,980 | A | 1/1978 | Yarem et al. |
| 4,119,025 | A | 10/1978 | Brown |
| 4,214,947 | A | 7/1980 | Berger |
| 4,340,184 | A | 7/1982 | Poss |
| 4,446,788 | A | 5/1984 | Molnar |
| 4,709,628 | A | 12/1987 | Glowacki |
| 5,034,124 | A | 7/1991 | Kopf |
| 5,067,926 | A | 11/1991 | Richburg |
| 5,100,551 | A | 3/1992 | Pall et al. |
| 5,333,556 | A | 8/1994 | Isobe et al. |
| 5,417,155 | A | 5/1995 | Tatsuzawa et al. |
| 5,515,776 | A | 5/1996 | Scheucher et al. |
| 7,191,700 | B2 | 3/2007 | Sasaki |
| 7,347,140 | B2 | 3/2008 | Scheucher et al. |
| 7,357,074 | B2 | 4/2008 | Kraft et al. |
| 8,746,138 | B2 * | 6/2014 | Lehoux .................. D21C 7/00 100/117 |
| 2003/0210605 | A1 | 11/2003 | Hauck et al. |
| 2005/0199559 | A1 | 9/2005 | Duby |
| 2005/0252845 | A1 | 11/2005 | Kemmelmeyer |
| 2006/0037905 | A1 | 2/2006 | Sasaki |
| 2006/0288884 | A1 | 12/2006 | Babbini et al. |
| 2009/0293742 | A1 | 12/2009 | Murphy et al. |
| 2010/0269990 | A1 | 10/2010 | Dottori et al. |
| 2010/0313882 | A1 | 12/2010 | Dottori et al. |
| 2012/0118517 | A1 | 5/2012 | Lehoux et al. |
| 2013/0264264 | A1 | 10/2013 | Lehoux et al. |
| 2014/0110324 | A1 | 4/2014 | Lehoux et al. |
| 2015/0336031 | A1 | 11/2015 | Lehoux et al. |
| 2015/0343350 | A1 | 12/2015 | Bradt et al. |

FOREIGN PATENT DOCUMENTS

| | | |
|---|---|---|
| CA | 2022884 A1 | 2/1991 |
| CA | 2022884 C | 4/2000 |
| CA | 2701407 A1 | 10/2010 |
| CN | 201454229 U | 5/2010 |
| CN | 101896666 A | 11/2010 |
| CN | 102007056 A | 4/2011 |
| CN | 201863401 U | 6/2011 |
| CN | 102527128 A | 7/2012 |
| CN | 202289634 U | 7/2012 |
| DE | 102004037350 B3 | 4/2006 |
| DE | 102012200167 A1 | 7/2013 |
| DE | 102012208647 A1 | 11/2013 |
| DE | 102012208649 A1 | 11/2013 |
| EP | 0358837 A1 | 3/1990 |
| EP | 0478623 A1 | 4/1992 |
| EP | 0700639 A1 | 3/1996 |
| GB | 2005555 A | 4/1979 |
| GB | 2306132 A | 4/1997 |
| GE | AP1996269 A | 6/1996 |
| GE | AP1996631 A | 6/1996 |
| JP | S4965563 A | 6/1974 |
| JP | S58153509 A | 9/1983 |
| JP | S59218298 A | 12/1984 |
| JP | S6163398 U | 4/1986 |
| JP | H01224199 A | 9/1989 |
| JP | H11253709 A | 9/1999 |
| JP | 2006055699 A | 3/2006 |
| JP | 2007021479 A | 2/2007 |
| JP | 2009183805 A | 8/2009 |
| JP | 2013545599 A | 12/2013 |
| RU | 2039583 C1 | 7/1995 |
| SU | 1346051 A3 | 10/1987 |
| UA | 68004 U | 3/2012 |
| WO | 9014878 A1 | 12/1990 |
| WO | 9213710 A1 | 8/1992 |
| WO | 0214598 A1 | 2/2002 |
| WO | 2011102691 A2 | 8/2011 |
| WO | 2012061942 A1 | 5/2012 |
| WO | 2013033770 A1 | 3/2013 |
| WO | 2013045091 A1 | 4/2013 |
| WO | 2013183285 A1 | 12/2013 |

OTHER PUBLICATIONS

International Patent Application No. PCT/CA2017/050509, International Search Report and Written Opinion dated Aug. 16, 2017.
Canadian Patent Application No. CA2932720, Office Action dated Jun. 9, 2017.
Chinese Patent Application No. CN2014800715623, Office Action dated May 17, 2017—English Translation Available.
Colombian Patent Application No. 13-135295, Office Action dated Jul. 3, 2014—English Translation available.
English Abstract of Ukraine Patent No. 68004 dated Mar. 12, 2012.
European Patent Application No. 11839592.0, Extended European Search Report dated Dec. 16, 2016.
European Patent Application No. 13772219, Supplementary European Search Report dated Mar. 17, 2016.
Georgian Application No. AP2013-013600, Documentary Conclusion dated Aug. 20, 2015.
Georgian Application No. AP2013-013600, Search Report dated Aug. 7, 2015.
International Patent Application No. PCT/CA2011/050695, International Preliminary Report on Patentability dated May 23, 2013.
International Patent Application No. PCT/CA2011/050695, International Search Report and Written Opinion dated Jan. 17, 2012.
International Patent Application No. PCT/CA2013/050279, International Preliminary Report on Patentability dated Oct. 16, 2014.
International Patent Application No. PCT/CA2013/050279, International Search Report dated Jun. 14, 2013.
International Patent Application No. PCT/CA2014/051132, International Preliminary Report on Patentability dated Jun. 9, 2016.
International Patent Application No. PCT/CA2014/051132, International Search Report and Written Opinion dated Feb. 11, 2015.
International Patent Application No. PCT/CA2014/051173, International Preliminary Report on Patentability dated Apr. 7, 2016.
International Patent Application No. PCT/CA2014/051173, International Search Report and Written Opinion dated Feb. 23, 2015.
International Patent Application No. PCT/CA2015/050463, International Preliminary Report on Patentability dated Dec. 1, 2016.
International Patent Application No. PCT/CA2015/050463, International Search Report and Written Opinion dated Aug. 19, 2015.
International Patent Application No. PCT/CA2015/050491, International Preliminary Report on Patentability dated Dec. 15, 2016.
International Patent Application No. PCT/CA2015/050491, International Search Report and Written Opinion dated Aug. 18, 2015.
Japanese Patent Application No. 2013-536969, Office Action dated Sep. 1, 2015.
Japanese Patent Application No. 2015-503721, Office Action dated Oct. 25, 2016 with English Translation.
Malaysian Patent Application No. PI2013001643, Examination Report dated Apr. 28, 2017.
New Zealand Patent Application No. 700457, Examination Report dated Aug. 31, 2015.
Philippine Patent Application No. 1/2013/500803, Examination Report dated Apr. 23, 2014.
Russian Patent Application No. 2014142310/05, Office Action and English Translation, dated Mar. 1, 2017.
Russian Patent Application No. RU2013123644, Office Action dated Jun. 28, 2016—English Translation available.
Supplementary Examination Report dated Nov. 10, 2016 issued on Singaporean patent application No. 11201406102Y.
Ukraine Patent Application No. UA201411044, Office Action dated Jun. 7, 2016—English Translation available.
U.S. Appl. No. 13/292,449, Notice of Allowance dated Apr. 7, 2014.
U.S. Appl. No. 13/292,449, Office Action dated Jan. 27, 2014.
U.S. Appl. No. 13/292,449, Office Action dated Sep. 9, 2013.
U.S. Appl. No. 13/857,655, Notice of Allowance dated Apr. 1, 2016.
U.S. Appl. No. 13/857,655, Notice of Allowance dated Apr. 4, 2017.

(56) References Cited

OTHER PUBLICATIONS

U.S. Appl. No. 13/857,655, Notice of Allowance dated Jan. 23, 2017.
U.S. Appl. No. 13/857,655, Notice of Allowance dated Mar. 2, 2017.
U.S. Appl. No. 13/857,655, Office Action dated Apr. 20, 2015.
U.S. Appl. No. 14/135,711, Office Action dated Nov. 2, 2015.
U.S. Appl. No. 14/718,686, Office Action dated Jan. 31, 2017.
U.S. Appl. No. 14/725,209, Office Action dated Jun. 1, 2017.
Written Opinion for Application No. PCT/CA2013/050279, dated Jun. 14, 2013, 4 pages.
European Patent Application No. EP17792320.8, Extended European Search Report dated Dec. 2, 2019.
Institute of Mechanization of Animal Production of the Academy of Agrarian Sciences of Ukraine, Screw press for pressing liquid from high moisture vegetable materials, Dec. 3, 2020, UA68004U—Abstract Only.
European Patent Application No. 13 772 219.5, Office Action dated Oct. 4, 2019.

* cited by examiner

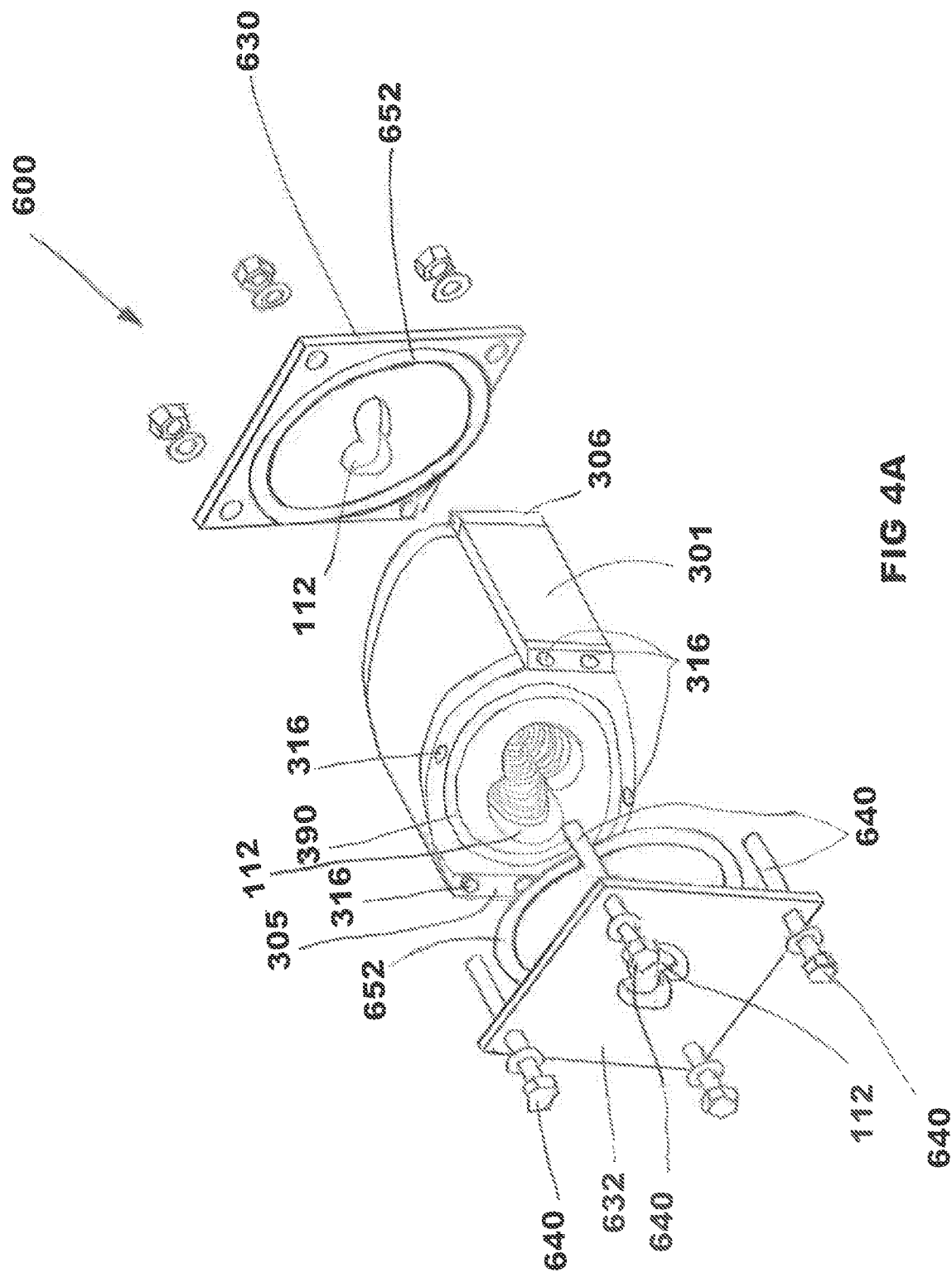

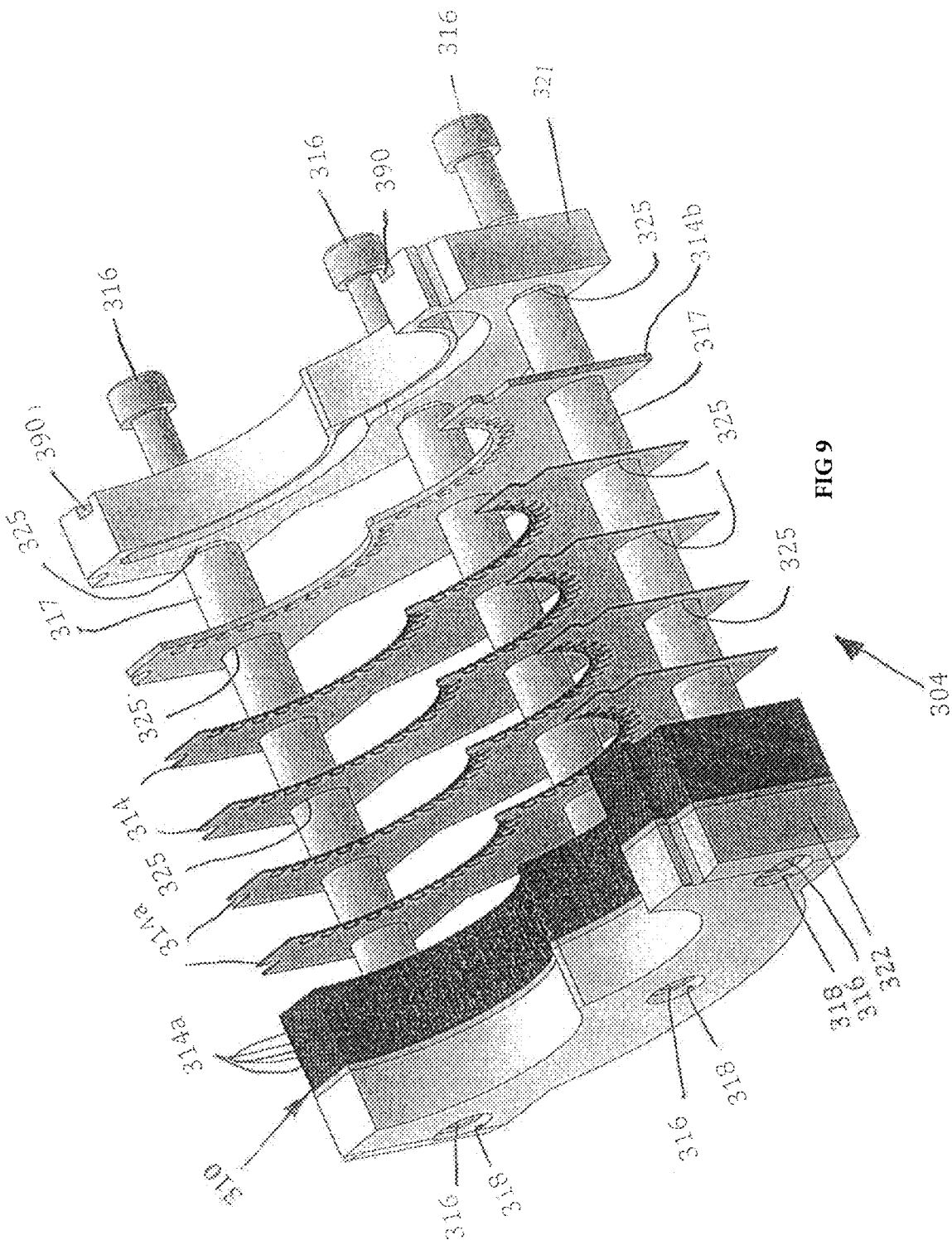

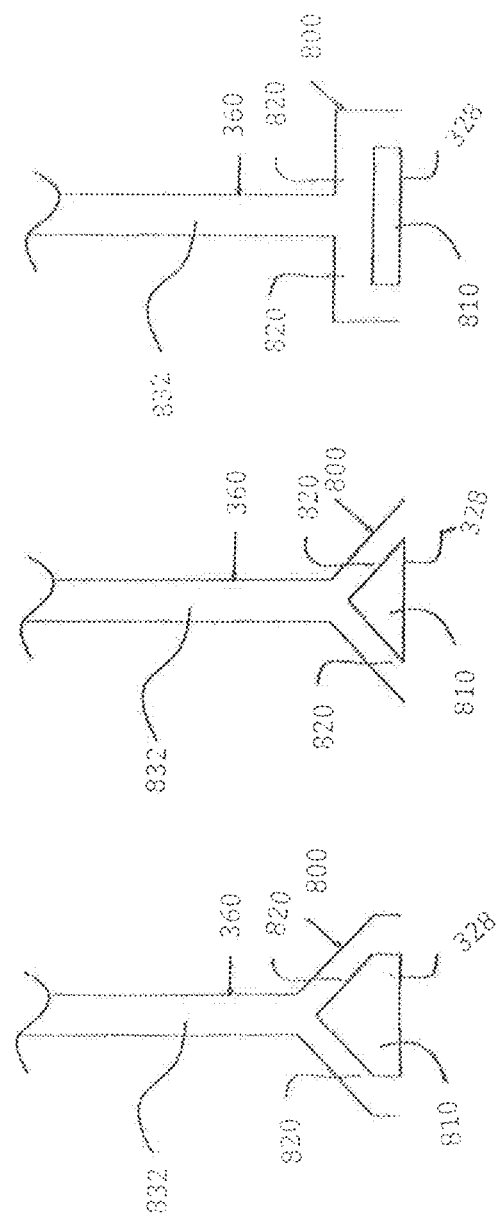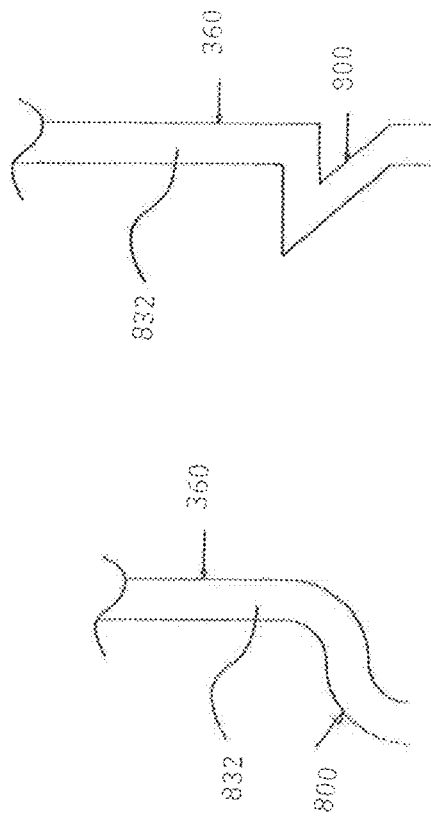

FILTER FOR EXTRUDER PRESS

This application claims the benefit of priority from U.S. Provisional Patent Application No. 62/330,444, filed May 2, 2016, the entire contents of which are incorporated by reference.

FIELD OF THE INVENTION

The present disclosure is broadly concerned with solid/fluid separation devices and methods for the separation of different types of solid/fluid mixtures.

BACKGROUND OF THE INVENTION

Solid/fluid or solid/liquid separation is necessary in many commercial processes, for example biomass processing, food processing (oil extraction), reduction of waste stream volume in wet extraction processes, dewatering processes, or suspended solids removal.

Many biomass treatment processes generate a wet fiber slurry from which dissolved compounds, gases and/or liquids must be separated at various process steps to isolate a solids and/or fibrous portion. Solid/fluid separation is generally done by filtration and either in batch operation, with filter presses, or continuously by way of rotary presses, such as screw presses.

Processes including the washing and subsequent concentration of a solid/liquid slurry under pressure require solid/liquid separation equipment able to operate under pressure, preferably without clogging. For example, a key component of process efficiency in the conditioning or pretreatment of lignocellulosic biomass is the ability to wash and squeeze hydrolyzed hemi-cellulose sugars, toxins, inhibitors and/or other extractives from the solid biomass/cellulose fraction. It is difficult with conventional equipment to effectively separate solids from liquid under pressure and especially the high temperature and pressure conditions required for cellulose pre-treatment.

During solid/fluid separation, the amount of liquid remaining in the solid fraction is dependent on the amount of separating pressure applied, the thickness of the solids cake, and the porosity of the filter. The porosity of the filter is dependent on the number and size of the filter pores. A reduction in pressure, an increase in cake thickness, or a decrease in porosity of the filter, will all result in a decrease in the degree of liquid/solid separation and the ultimate degree of dryness of the solids fraction.

For a particular solids cake thickness and filter porosity, maximum separation is achieved at the highest separating pressure possible. Moreover, for a particular solids cake thickness and separating pressure, maximum separation is dependent solely on the pore size of the filter.

High separating pressures unfortunately require strong filter media, which are able to withstand the separating pressure within the press, making control of the filtering process difficult and the required equipment very costly. Filter media in commercially available Modular Screw Devices (MSDs) are generally in the form of perforated pressure jackets. The higher the separating pressures used, the stronger (thicker) the filter media (pressure jacket) need to be in order to withstand those pressures. The thicker the pressure jacket, the longer the drainage perforations, the higher the flow resistance through the perforations and the higher the risk of clogging. In order to achieve with high-pressure jackets (thick jackets) the same filter flow-through capacity as with low-pressure jackets (thin jackets), the number of perforations must be increased. However, increasing the number of perforations weakens the pressure jacket, once again reducing the pressure capacity of the filter unit.

Another approach to overcome the higher flow resistance encountered with longer perforations is to increase the diameter of the perforations. However, this will limit the capacity of the filter to retain small solids, or may lead to increased clogging problems. Thus, the acceptable pore size of the filter is limited by the size of the fibers and particles to be retained in the solids fraction. The clarity of the liquid fraction is limited solely by the pore size of the filter media and pores that are too large reduce the liquid/solid separation efficiency and potentially lead to plugging of downstream equipment.

Over time, filter media tend to plug with suspended solids, especially at elevated pressures. Thus, backwashing is generally required to clear any blockage and restore the original production rate of the filter. However, once a filter becomes plugged, it takes a pressure higher than the operating pressure to backwash the media. This can become problematic when working with filter media operating at pressures above 1000 psig in a process that is to be continuous to maximize the production rate, for example to obtain high cellulose pre-treatment process efficiency. Thus, it would be preferable to backwash prior to complete plugging of the filter. However, most backwashing requires interruption of the filtering operations, so that increased backwashing reduces the production rate.

Conventional single, twin, or triple screw extruders do not have the residence time necessary for pre-treatment of biomass, and also do not have useful and efficient solid/fluid separating devices for the pre-treatment of biomass, in particular lignocellulosic biomass. U.S. Pat. Nos. 3,230,865 and 7,347,140 disclose screw presses having a perforated casing for solid/liquid separation. Operating pressures of such a screw press are low, due to the low strength of the perforated casing. U.S. Pat. No. 5,515,776 discloses a worm press having drainage perforations in the press jacket, which increase in cross-sectional area in flow direction of the drained liquid. U.S. Pat. No. 7,357,074 is directed to a screw press with a conical dewatering housing with a plurality of perforations for the drainage of water from bulk solids compressed in the press. Again, a perforated casing or jacket is used. As will be readily understood, the higher the number of perforations in the housing, the lower the pressure resistance of the housing. Moreover, drilling perforations in a housing or press jacket is associated with serious challenges when very small apertures are desired for the separation of fine solids.

U.S. Pat. No. 8,746,138 discloses a solid/fluid separation module with high porosity for use in a high internal pressure press device for solid/fluid separation at elevated pressures. The filter module includes filter packs respectively made of a pair of plates that create a drainage system. A filter plate with cut through slots creates flow channels for the liquid to be removed and a backer plate creates a drainage passage for the liquid in the flow channels. The backer plate provides the structural support for containing the internal pressure of the solids in the press during the squeezing action. The need for a backer plate for each filter plate limits the filter porosity, since the axial length of the module represented by the cumulative thickness of the backer plates cannot be used for filtering. Moreover, the use of a filter slot in combination with a drainage passage in the backer plate results in a long, tortuous path of the separated fluids with elevated backpressure and ample opportunity for fines accumulations in the slot and/or the passage.

Published U.S. Application US 2015/0336031 discloses another solid/fluid separation module with high porosity for use in solid/fluid separation of a pressurized mass in screw type press devices. The separation module includes a housing creating a pressurizable fluid collection chamber and a barrel section having an axial core opening for containing the pressurized mass under pressure. The barrel section is mounted in the housing and includes a filter block, which forms at least an axial portion of the barrel. The filter block includes a plurality of stacked barrel plates, each having an inner edge defining the core opening and an outer edge in contact with the collection chamber. The barrel plates are constructed as a filter plates having a recessed filter passage extending from the inner edge to the outer edge for draining fluid in the pressurized solid/fluid mixture from the core opening to the collection chamber. This creates a relatively long flow path in the filter passage. To address the elevated risk of clogging associated with such a long filter passage, the filter passage at the inner edge is provided with a deviation which prevents fibrous particles from penetrating into the filter passage to any significant extent. However, clogging of the filter passage with fines is still possible and removal of such clogging may prove challenging due to the long filter passage. Cleaning of a permanently clogged filter block requires disassembly of the press device and especially removal of the conveying elements of the device.

Published U.S. Application US 2015/0343350 discloses a further solid/fluid separation module for use in screw type press devices. The module can be incorporated as a barrel module into a modular screw device or a screw extruder and includes a split filter unit allowing for assembly or removal of the filter unit without removal of the screw or extruder screw. The split filter unit includes first and second filter blocks joinable along a longitudinal plane of symmetry of the core passage. The filter blocks are mounted in a sealed housing so that the housing and joined filter sections together define a longitudinal portion of the core passage. The filter blocks including a plurality of barrel plates having an inner edge located at the core opening and an outer edge for contact with a fluid collection chamber formed by the housing. The barrel plates are constructed as filter plates and include a filter passage extending from the inner edge to the outer edge for filtering of the pressurized mass at the inner edge and draining of the separated fluid into the collection chamber at the outer edge. Fluid separated from the pressurized mass by the filter block through the filter passage is collected in the collection chamber from which it is then drained. Clogging of the filter passage with particulates occurs due to the long filter passage extending from the core opening to the outside of the filter block. The length of the filter passage also makes, removal of such clogging challenging and backwashing is difficult due to significant backpressure. Moreover, backwashing of a clogged filter block requires the draining of the separated fluids from the collection chamber, supplying backwashing fluid into the chamber and removing the backwashing fluid upon completion of the backwash cycle. This creates significant down time and cost.

SUMMARY OF THE INVENTION

It is an object of the present invention to obviate or mitigate at least one disadvantage of previous solid/liquid separation devices and processes.

In order to improve the operation and maintenance of a solid/fluid separation device, the invention provides a filter unit for a solid/fluid separating press having a barrel with a core opening for containing a solid/fluid mixture and housing at least one conveyor screw for conveying the solid/fluid mixture, the barrel being divided into at least two barrel modules respectively defining an axial portion of the barrel. The filter unit forms at least one of the barrel modules and includes a filter block with an internal fluid collection chamber, rather than an external collection chamber. By providing an internal collection chamber, the distance between the core opening and the collection chamber, and thus the distance and fluids separated from the mixture in the core opening must travel in a filter passage is reduced, which reduces backpressure and fines accumulations and facilitates backwashing.

In one embodiment, the filter unit includes a pair of end plates for connection to adjacent barrel modules and a barrel section formed by a plurality of barrel plates stacked one behind the other and sealingly compressed into a plate stack between the end plates. Each of the end plates and barrel plates has a core opening equal in cross-section to the core passage. Each barrel plate has a front face, a back face, and a drainage perforation separate from the core opening. The core opening and drainage perforation each extend from the front face to the back face. In the filter unit, all end plates and barrel plates are aligned such that the core openings form the core passage of the filter block. Moreover, the barrel plates are aligned such that the drainage perforations form an internal fluid collection chamber within the filter unit. At least one of the barrel plates is constructed as a filter plate including at least one filter passage extending from the core opening to the drainage perforation and at least one of the end plates has an evacuation passage connected at an input end with the collection chamber and at an output end with an exterior of the filter block for draining from the collection chamber separated fluids that were separated from the solid/fluid mixture through the filter passage.

In another embodiment, each end plate has an evacuation passage for the collection chamber. By providing an evacuation passages at both ends of the collection chamber, separated fluids in the collection chamber can be circulated through the collection chamber for reducing the accumulation of fines deposits, or resinous deposits, for example lignin, in the collection chamber.

In a further embodiment, each barrel plate includes at least two separate drainage perforations for the formation of an equal number of internal collection chambers within the plate stack and at least one filter passage for each drainage perforation.

In yet another embodiment, each filter plate includes at least two filter passages extending from the core opening to each drainage perforation.

In still another embodiment, each barrel plate includes a number of separate drainage perforations distributed about the core opening for the formation of an equal number of separate interior collection chambers in the filter block. One or more filter passages can be provided for each drainage perforation.

In yet a further embodiment, at least one end plate includes a separate evacuation passage for each interior collection chamber. In still a further embodiment, both end plates include a separate evacuation passage for each collection chamber to allow for circulation of separated fluids through each collection chamber independently and to allow for backwashing of each collection chamber independently.

The filter passage may be a slit cut through the filter plate, a recess provided in the front face of the filter plate, a recess provided in the back face of the filter plate, or a pair of recess provided in the front and back faces respectively.

In still a further embodiment, the filter unit is connectable to a pressure input for selectively connecting the output end of each evacuation passage to a source of backpressure for generating a reverse flow of the separated fluids, or a backwashing fluid, in the collection chamber and the filter passage for backwashing of at least the filter passage.

Where separate evacuation passages are provided for the collection chambers in the filter unit, each evacuation passage may be individually connectable to the pressure input. One, two or more of the evacuation passages may be simultaneously connectable to the pressure input.

By providing each filter plate with a drainage perforation located within the confines of the filter plate and separate from the core opening, the distance of travel of filtered fluid within the filter passage is shortened and the need for a pressurizable collection chamber about the plate stack is obviated. By aligning the drainage perforations in adjacent filter plates, a fluid collection conduit is formed that principally functions like an internal fluid collection chamber located fully within the plate stack and closed by the end plates. This simplifies construction of the separation device. Moreover, a pressure input may be provided for generating a backpressure in the separated fluids in the conduit. That backpressure can be used to generate a reverse flow of the separated fluids in the collection conduit and the filter passages to achieve a backwashing of the filter passages connected to the collection conduit. This obviates the need for first draining the separated fluids and the need for using a separate backwashing fluid. Moreover, by simply applying a backpressure to the separated fluids in the collection conduit, backwashing can be carried out repeatedly and/or periodically to not only remove, but prevent, clogging. In addition, by providing the collection conduit within the filter stack, thereby allowing the direct application of backpressure, periodic backwashing can be carried out during operation and without interruption of the treatment of the pressurized mass. The end plates may be provided with an evacuation passage for each collection chamber to allow individual backwashing of each collection chamber and the respectively connected filter passages. If one or only a few collection chambers are backwashed at any given time, the backwashing and separating processes can be operated simultaneously, thereby providing for continuous operation of the filter press and significantly reducing down times.

Although two or more filter passages can be connected to the same drainage perforation, in one embodiment of the invention each filter passage is connected to an individual drainage perforation. In a further embodiment, each filter plate includes multiple filter passages in the front face and one drainage perforation for each filter passage, so that the plate stack includes a number of collection conduits equal to the number of filter passages in each filter plate. In another embodiment, the cross-sectional area of the drainage perforation is always a multiple of the cross-sectional area of the filter passage. In a further embodiment, the cross-sectional area of each collection conduit formed in the plate stack is equal to or larger than a cumulative cross-sectional area of all filter passages connected thereto.

In still a further embodiment, a large number, or the majority, of the barrel plates in at least one of the filter blocks are constructed as a filter plate. To achieve the highest possible porosity, each barrel plate may be constructed as a filter plate. Moreover, each filter plate may include multiple filter passages. The number of filter passages in each filter plate may be chosen to maximize porosity without compromising filter plate or filter block integrity.

The separation module of the invention may be used, for example, in a large bore screw extruder for compressing the solid/fluid mixture at pressures above 300 psig.

To achieve improved operating flexibility at reduced maintenance cost, the solid/fluid separation module of the invention in still another embodiment requires only the stopping of the screw rotation for replacement of the filter stack without any disassembly of any part other than the separation module. This is achieved by a split filter unit including first and second filter block sections sealably joinable along a longitudinal plane to define the core passage of the extruder screw. The filter block sections are preferably sealably joinable along a plane of symmetry of the core passage so that the joined filter block sections together define the longitudinal portion of the core passage.

In one embodiment, at least one of the filter block sections is a stacked filter block including a plurality of stacked barrel plate sections sealingly compressed one behind the other into a plate section stack between a pair of end plate sections. Each barrel plate section has flat front and back surfaces, an inner edge located at the core opening and an outer edge. At least one barrel plate section adjacent one of the end plates is a perforated barrel plate section having a drainage perforation separate from the core opening, the core opening and drainage perforation each extending from the front face to the back face, and all end plate sections, barrel plate sections and perforated barrel plate sections in the split filter unit being oriented for the core openings to align and form the core passage of the filter block and all perforated barrel plate sections being aligned for the drainage perforations to align and form an internal fluid collection chamber within the filter block. At least one of the perforated barrel plate sections is constructed as a filter plate section including at least one filter passage extending from the core opening to the drainage perforation. The drainage perforation extends completely through the filter plate section from the front face to the back face. In the filter block, the drainage perforations in mutually contacting filter plate sections are aligned to form an internal fluid collection chamber extending through the stacked filter plate sections for collecting fluids drained from the respectively connected filter passages. In the filter block, at least one of the end plate sections has a compression face in contact with one of the filter plate sections, the compression face having a drainage passage fluidly connected at an input end with the drainage perforation of the adjacent filter plate section. This allows fluid to drain from the collection conduit extending from the drainage perforation. At an output end, the drainage passage opens to an exterior of the plate section stack, which allows fluids accumulating in the drainage passage and the collection conduit to be drained to the exterior of the separation module.

In a variant embodiment, the separation module includes a split filter unit made of a stack of barrel plates which each have a central bore for receiving the extruder screw and are each split into first and second barrel plate sections along a separation plane extending across a line of symmetry of the central bore. When the barrel plate sections are stacked, the division of the barrel plates into the first and second barrel plate sections leads to a division of the filter unit along the separation plane into first and second filter blocks or filter halves, which can be placed about the conveyor screw. The end plates may be whole or split and either remain installed about the conveyor screw when whole, or are integrated with the filter block when split. Preferably, each filter block of the split filter unit includes pair of end plate sections.

In either embodiment, each filter block also includes a stacking structure for aligning the stacked plate sections and for combining them into the filter block. The separation module further includes a clamping structure for clamping the first and second filter blocks about the conveyor screw to form a clamped split filter block enclosing the extruder screw and sealing the core opening along the separation plane. At least one of the stacked barrel plate sections is constructed as a filter plate section defining a filter passage for liquid to drain away from the central bore.

For removal of the split filter unit from the extruder, the clamping structure is opened and one or both of the filter block sections removed from the extruder. By incorporating the separated fluid collecting structure within the filter block section, the housing for the split filter unit is obviated. Assembly and disassembly of the split filter unit is thereby much simplified and maintenance downtimes are reduced. The installation of replacement filter blocks, different filter blocks, or the same filter blocks after cleaning, is then achieved in reverse order. A seal is preferably inserted between the first and second filter block sections in the separation plane for improved sealing of the central bore and split seals are preferably provided between the filter blocks and adjacent barrel modules.

The filter passages can be formed directly in the filter plate by cutting filter slots into the filter plate, or by simply recessing a fluid passage into either one or both surfaces of the filter plate. This can be achieved much more easily than the conventional approach of drilling holes in a pressure jacket. For example, a recessed filter passage can be produced by etching the filter passage into the filter plate surface. By only recessing the filter passage into a surface of the filter plate, the overall integrity of the filter plate is affected less than in filter plates having cut through filter slots. Using recessed passages allows for the creation of much smaller filter pores by using very narrow and shallow passages. For example, by cutting a filter passage of 0.01 inch width and 0.001 inch depth into the filter plate, a pore size of only 0.00001 square inch can be achieved (smallest depth of passage*smallest width of passage).

In one aspect, the invention provides a filter unit for a solid/fluid separating press with at least one conveyor screw for conveying a solid/fluid mixture, the press having a barrel divided into at least two barrel modules respectively defining a longitudinal portion of a core passage for housing the at least one conveyor screw. At least one of the barrel modules is a filter unit including first and second filter blocks joinable along a longitudinal plane of symmetry of the core passage for defining the core passage when joined along the plane of symmetry. The filter blocks are sealably joined for together defining the longitudinal portion of the core passage. At least one of the filter blocks is a stacked block including a plurality of the barrel plate sections, while the other block may be a solid block.

Each filter plate section can have a preselected pore size, whereby each filter passage has an opening area at the inner edge corresponding to the preselected pore size. Moreover, each filter block may have a preselected filter pore size and a preselected porosity, whereby each filter passage has an opening area at the inner edge corresponding to the preselected pore size, each filter plate section having a plate porosity calculated from a total surface of the core opening, the preselected pore size and the number of filter passages. The porosity of the filter block is then calculate as the sum of the plate porosities of all filter plate sections in the stack.

In yet another aspect, the invention provides a solid/fluid separating press including at least one conveyor screw for conveying a solid/fluid containing mixture and a barrel defining a core passage for the at least one extruder screw, the core passage having a longitudinal axis for each extruder screw, the barrel including at least two barrel modules, all of which are solid/fluid separating modules in accordance with the invention. In another embodiment, each solid/fluid separating module has a preselected pore size and each filter passage has an opening area at the inner edge corresponding to the preselected pore size. The filter module may have a preselected porosity calculated from a total surface of the core opening divided by the preselected pore size and the number of filter passages in the filter blocks.

In still another aspect, the invention provides a use of the solid/fluid separating press in accordance of the invention for separating fluids from a solid/fluid containing mixture, for example biomass, such as lignocellulosic biomass.

The separation module in accordance with the invention in one embodiment includes a filter unit having a porosity of 5% to 20% (total pore area relative to the total filter surface) and is constructed to withstand operating pressures of 300 psig to 10,000 psig, at a filter porosity of 5 to 20%, or 11 to 20%. Each filter plate may include a plurality of filter passages with a pore size of 0.0005 to 0.00001 square inch.

In another embodiment, the filter unit includes filter plates, or filter plate sections with filter passages having a pore size of 0.00001 square inch for the separation of fine solids, a porosity of 5.7% and a pressure resistance of 2,500 psig. In still another embodiment, the filter unit includes pores having a pore size of 0.0005 square inch and a porosity of 20% and a pressure resistance of 5,000 psig. In a further embodiment, the filter unit includes pores of a pore size of 0.00005 square inch and a porosity of 11.4%. In still a further embodiment, the filter unit includes pores having a pore size of 0.00001 square inch and a porosity of 20%.

In the filter unit in accordance with the invention, the pore size can be controlled by varying either one or both of the width and depth of the filter passages. To maintain maximum filter plate integrity, the depth of the filter passage can be maintained as small as possible and pore size controlled by varying the filter passage width. The width of the filter passages may vary from 0.1 inch to 0.01 inch and the depth of the filter passages may vary from 0.001 inch to 0.015 inch. The filter passages in a filter plate may all have the same pore size, or may have different pore sizes.

In the solid/fluid separation press in accordance with the invention, the separation module is mounted to the barrel of the press and the core opening is sized to fittingly receive a longitudinal portion of the extruder screw, or screws, of the press. The conveyor screw has sufficiently close tolerances to the central bore of the clamped filter block for generating a significant separating pressure. This provides a solid/fluid separation device, which allows for the separation of solid and liquid portions of a solid/fluid mixture in a high pressure and high temperature environment.

In a further embodiment of the solid/fluid separation press, the press includes twin, intermeshing conveyor screws, the separation module is mounted to the barrel of the twin screw press and the central bore is sized to fittingly receive a portion of the intermeshing conveyor screws.

Other aspects and features of the present disclosure will become apparent to those ordinarily skilled in the art upon review of the following description of specific embodiments in conjunction with the accompanying figures.

BRIEF DESCRIPTION OF THE DRAWINGS

For a better understanding of the embodiments described herein, and to show more clearly how they may be carried into effect, reference will now be made, by way of example only, to the accompanying drawings which show the exemplary embodiments and in which:

FIG. 4a schematically illustrates an embodiment of a filter unit in accordance with the invention in axially exploded view;

FIG. 9 illustrates the lower filter plate stack of FIG. 7 in exploded view;

FIG. 10a is an axial plan view of an exemplary filter plate for inclusion in the filter plate stack of the filter unit of FIG. 4a;

FIGS. 19A to 19E are variants of the intake end of FIG. 18;

DETAILED DESCRIPTION OF THE PREFERRED EMBODIMENTS

Figure 1:
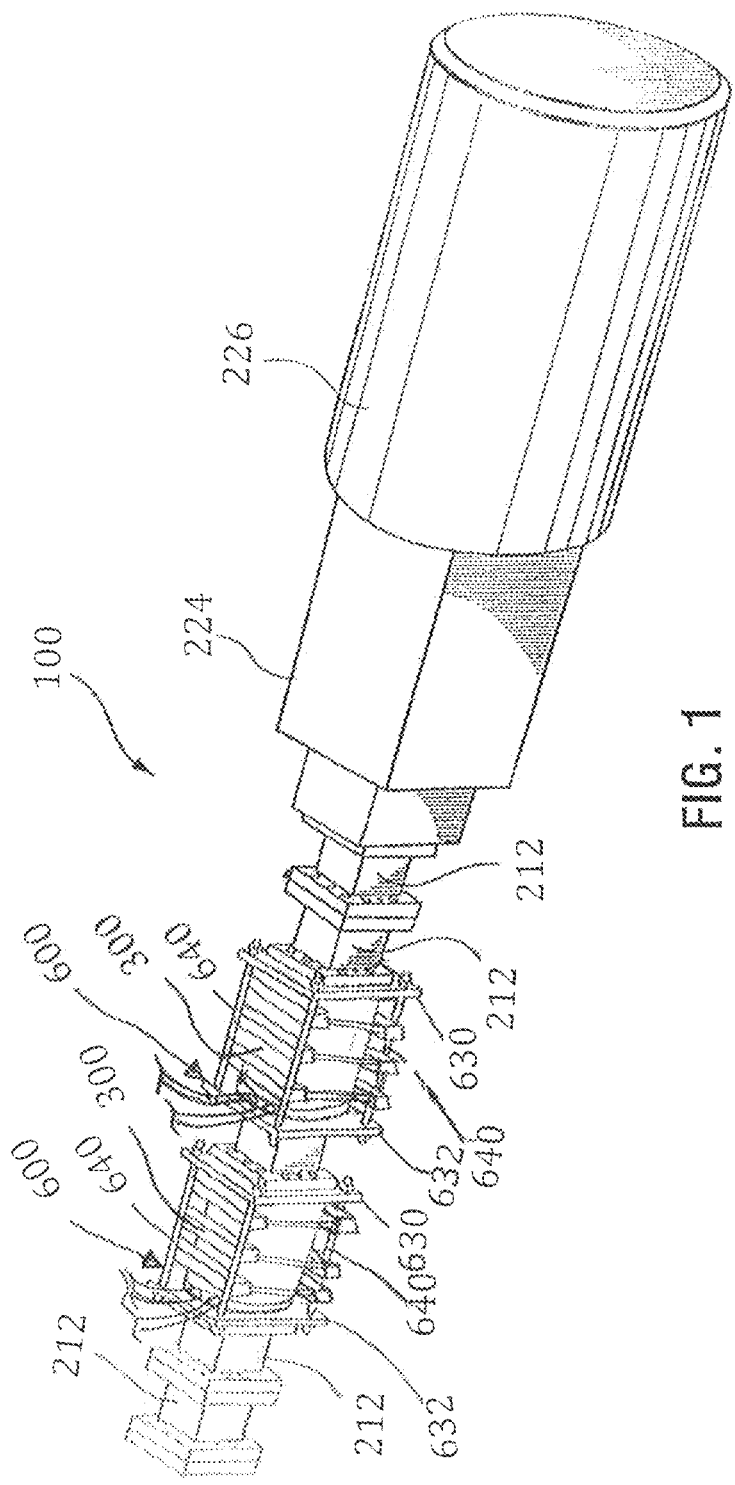
FIG. 1 is a partially schematic side elevational view of an exemplary solid/fluid separating press including a pair of separation modules in accordance with the invention.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The solid/fluid separation module of the invention is intended for use with a single screw, twin screw or multi-screw solid/fluid separation press, for example a twin screw extruder assembly having parallel or non-parallel screws with the flighting of the screws intercalated or intermeshed at least along a part of the length of the extruder barrel to define close-clearance spaces between the screws and between each screw and the barrel. However, the solid/fluid separation module of the invention can also be used with screw extruders having more than two conveyor screws.

In prior filter or solid/fluid separation devices for use with MSDs or extruders, the integrity of the filtering jacket under pressure is dependent on jacket thickness and porosity. Filter capacity is dependent on jacket porosity. However, the higher the jacket porosity the lower the pressure resistance of the filter jacket. Efforts to address this problem by building the filter jacket from stacked filter plates as disclosed in U.S. Pat. No. 8,746,138, published U.S. Application US 2015/0336031 and published U.S. Application US 2015/0343350 have resulted in improved filter integrity, but are still subject to clogging caused by fine particulates accumulating and eventually blocking the individual filter passages. The inventors have now surprisingly discovered that the degree and speed of clogging is more closely linked with the length of the filter passage than the width of the filter passage. That means filter passages which widen from the core opening to the outside of the filter unit become clogged as often as filter passages of constant cross-section, while a direct relationship exists between the length of a filter passage and the risk of clogging. However, short filter passages require filter jackets of small thickness or filter plates having a narrow annulus surrounding the core opening and those jackets and filter plates are undesirable because of their low pressure resistance. Thus, a solution was required for the problem of providing short filter passages in thick filter jackets or filter stacks for screw conveyors operating at elevated pressures.

The inventors have now found a solution which effectively reduces the length of the filter passages in a stacked filter unit without significantly reducing the pressure resistance of the plate stack due to a wide, continuous annulus remaining in each filter plate, which annulus provides the plate with its pressure resistance. This is achieved by using a transverse drainage perforation that extends through the filter plate separate from the core opening. The drainage perforation is used together with a filter passage which extends from the core opening to the drainage perforation. The drainage perforation is located within the filter plate, between the inner and outer edges of the filter plate so that the filter plate includes a continuous annulus radially outward from the perforation. The perforation is preferably closer to the inner edge than to the outer edge to minimize the length of the filter passage. In the filter stack, the drainage perforations of adjacent filter plates are aligned to form a drainage conduit, which drainage conduit is connected at the end plates to the outside of the stack. By providing the transverse perforation within the filter plate and close to the core opening, the operational thickness of the filter plate as far as the filtering operation is concerned (filter thickness) is much reduced, while the operational thickness of the filter plate as far as the pressure resistance is concerned (overall thickness) remains the same. Moreover, the need for an external, sealed fluid collection chamber surrounding the stack of filter plates, as disclosed in the known stacked filter units mentioned above is obviated, since replaced by the internal collection chamber. In addition, the use of the transverse perforation within the filter plate for the first time allows for the selection of an overall thickness of the filter plate independent from the length of the filter passage and the inner diameter of the external collection chamber.

The perforation in the filter plate may have a cross-section at least as large as the cross-section of the filter passage connected thereto. Preferably the perforation has a cross-section at least twice the cross-section of the filter passage connected thereto. In one embodiment, two filter passages are connected to each perforation. Preferably, the cross-section of the perforation is at least twice the cumulative cross-section of all filter passages connected thereto. In another embodiment, more than two filter passages are connected to each drainage perforation. If maximum drainage capacity is desired, a drainage perforation may be provided for each filter passage.

The filter unit may be constructed as a single block filter unit or as a split filter unit for a solid/fluid separating device, or a solid/fluid separating screw press, or a modular screw device. The single block filter unit or split filter unit can be installed into and/or removed from the solid/fluid separating device or press without requiring disassembly of the separating device, any assembly or disassembly being limited to the split filter unit of the separating module. In particular, the split filter unit of the invention can be installed or removed from the separating module without removal of the conveyor screw from the screw press.

In addition to this advantage, the solid/fluid separating module of the invention can include a filter unit able to handle very high pressures (up to 20,000 psig). Some or all of the barrel plates in the stacked filter unit can be constructed as filter plates to create a filter plate stack able to generate solids levels from 50-90%. The filter plate stack can provide the further advantage of a very small pore size filter, so that a liquid portion extracted with this filter can contain little suspended solids. The combination of a high pressure filter unit in accordance with the invention with a twin-screw extruder press can result in a solid/liquid separation device capable of developing virtually dry cake of a solids level above 80%. A twin conveyor screw press in accordance with the invention and including a filter unit in accordance with the invention can process a solid/fluid mixture in a thin layer at pressures exceeding 300 psi while at the same time allowing trapped liquid and water a path to migrate out of the mixture through the filter unit.

Using a screw press or extruder press with a filter unit in accordance with the invention, one can apply significant shear forces/stresses to a solid/fluid mixture, which forces are applied in a thin cake to free up liquid to migrate out through the filter unit. More importantly, using an internal fluid collection chamber within the filter block simplifies the filter unit in accordance with the invention and reduces the length of the individual filter passages, which may reduce the risk of clogging, reduce back pressure and facilitate backwashing.

Turning now to the drawings, FIG. 1 schematically illustrates an exemplary solid fluid separating apparatus 100 in accordance with the invention. The apparatus includes a twin-screw extruder with a barrel 216 divided into barrel modules 212 and separation modules 600 including filter units 300. The extruder is driven by a motor 226 through an intermediate gear box drive 224, both the motor and gear box being conventional components. Although the separation modules 600 in the illustrated exemplary embodiment are shown to have a larger axial length than the barrel modules 212, in another embodiment, the axial length of the separation modules 600 can be adjusted to be identical to that of the barrel modules 212, to allow for swapping of the barrel modules with the separation modules and vice versa. The separation modules 600 in accordance with the invention, will be described in more detail in the following.

Figure 2:
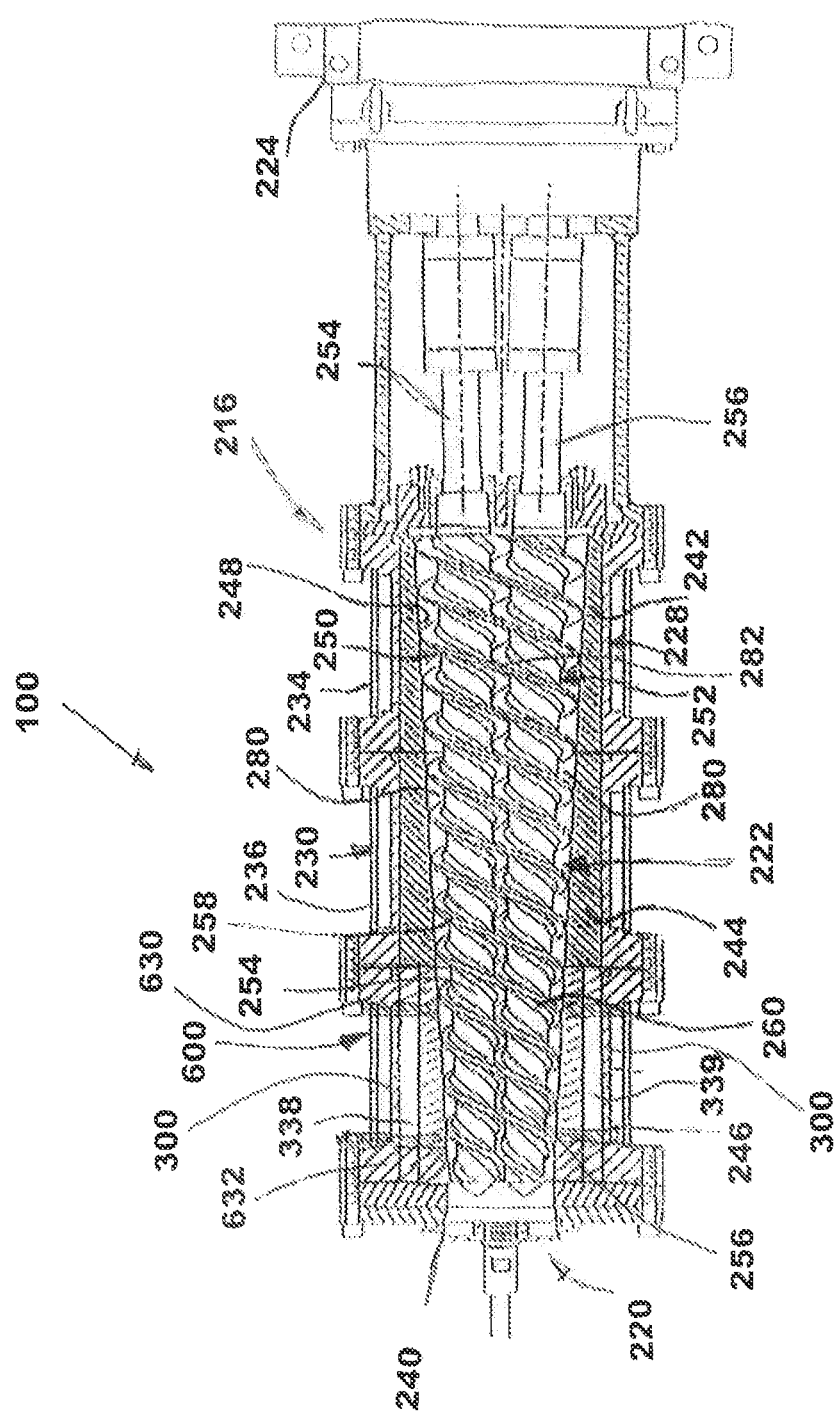
FIG. 2 is a vertical sectional view of an exemplary press as shown in of FIG. 1, but including only one separation module, for reasons of simplicity.

FIG. 2 illustrates a simplified exemplary embodiment of the apparatus 100 shown in FIG. 1, including only a single separating module 600. As is apparent from FIG. 2, the apparatus 100 broadly includes a sectionalized barrel 216 with an outlet 220 and a specialized twin screw assembly 222 within the barrel 216; the assembly 222 is coupled via the gear box drive 224 to the motor 226 (see FIG. 1). The barrel 216 in the simplified exemplary embodiment illustrated is made up of two end-to-end interconnected tubular barrel modules 228, 230, and a separating module 600. Each barrel module is provided with an external jacket 234, 236, to allow circulation of cooling or heating media for temperature control of the extruder device. The separating module 600 includes internal collection chambers 338,339. The separating module 600 may include a die 240. The die includes a central opening, the width of which is selected to produce the desired back pressure in the barrel 216 and the separating module 600. Other means for generating a back-pressure at the separation module can also be used. The pressure in the barrel 216 and the separating module 600 can also be controlled by the fit between the screws 250,252 and the barrel 216 and the rotational speed of the screws 250, 252. Each of the modules 228, 230 also includes an internal sleeve 242, 244 which defines a continuous screw assembly-receiving opening or core passage 248 within the barrel. This core passage 248 can be tapered as shown in FIG. 2, or cylindrical (when cylindrical screws are used) and has a generally "figure eight" shape in order to accommodate the dual screw assembly 222. In the illustrated exemplary embodiment, the core opening 248 is widest at the rear end of barrel module 228 and progressively and uniformly tapers to the end of the apparatus at the outlet 220 of the barrel 216. It will be observed that the assembly 222 also presents material backflow passageways 280 and kneading zones 282 between the screws 250, 252.

Figure 3A:
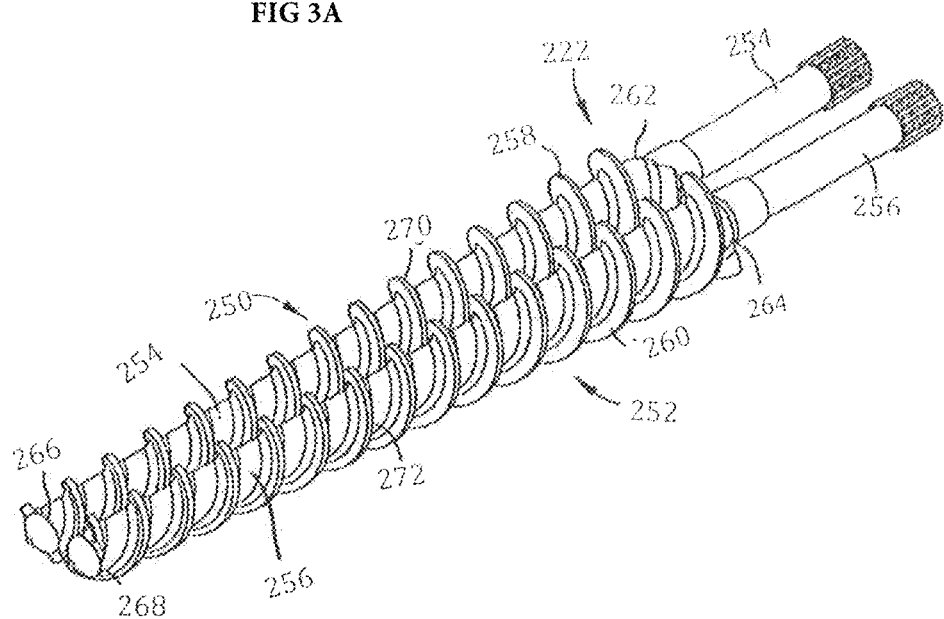
FIG. 3a is a perspective view of an exemplary, tapered twin extrusion screw set, which may be used in the exemplary embodiment of FIG. 1.
Figure 3B:
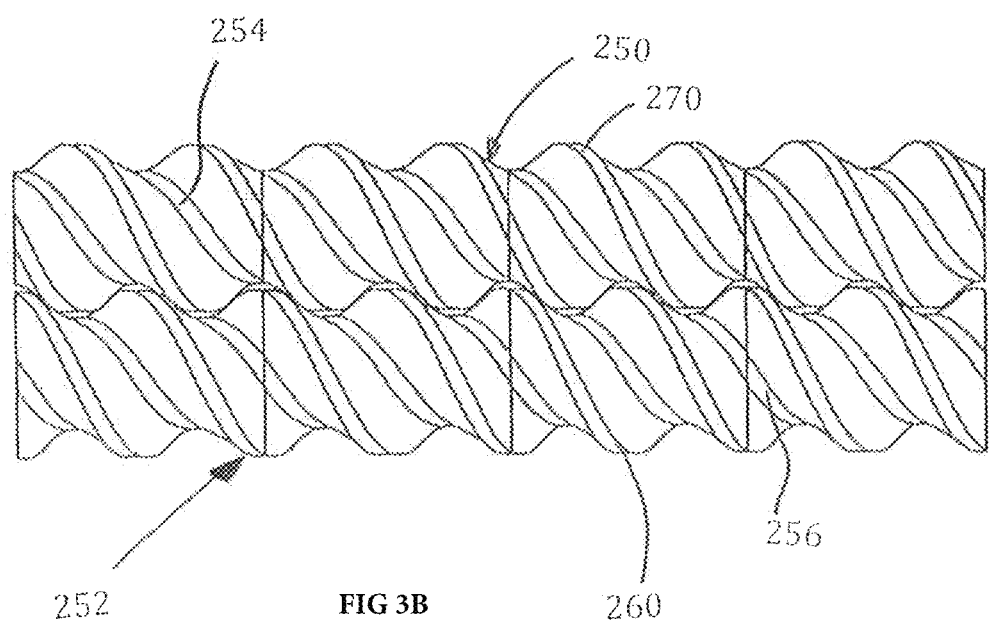
FIG. 3b is a plan view of an exemplary, non-tapered twin extrusion screw set, which may be used in the exemplary embodiment of FIG. 1 together with a cylindrical barrel (not shown)

The screw assembly 222 includes first and second elongated screws 250, 252 which are in side-by-side relationship as best seen in FIG. 3a. If a non-tapered barrel of constant cross-section is used (not shown), a pair of straight or cylindrical screws as shown in FIG. 3b can be used as screws 250 and 252. As shown in FIG. 2, each of the screws 250, 252 includes an elongated central shaft 254, 256 as well as outwardly extending helical flighting 258, 260. In the tapered screws as shown in FIGS. 2 and 3a, the shafts 254, 256 each have an outer surface which is progressively and uniformly tapered through a first taper angle from points 262, 264 proximal to the rear ends of the corresponding shafts 254, 256, to forward points 266, 268 adjacent the forward ends of the shafts. This taper angle generally varies from about 0.5-5°, and more preferably from about 1-2.2°. The illustrated embodiment has a taper angle of 1.3424°.

The flighting 258, 260 (in the embodiment illustrated double flights are used, but single or multiple flights are also a possibility) extends essentially the full length of the shafts 252, 254 between points 262, 266 and 264, 268. Thus, the flighting 258, 260 proceeds from a rear end adjacent the point 262, 264 in a continuous fashion to the forward point 266, 268. In addition, the flighting presents an outer surface 270, 272 on each of the screws 250, 252. The geometry of the flighting 258, 260 is such that the flight depth progressively and uniformly decreases as the flighting proceeds from the rear end to the front end of the screws 250, 252. Consequently, the outer surfaces 270, 272 of the flighting 258, 260 also taper from rear to front in a progressive and uniform fashion. The second angle of taper of the flighting depth and the outer flighting surfaces can range from 2-6° and in the illustrated embodiment is 3.304°.

Finally, the flighting 258, 260 can be designed so that the width of the flighting outer surfaces 270, 272 increases in a progressive and uniform fashion from the rear end of the screws to the front ends thereof. This configuration is best illustrated in FIGS. 2 and 3a, where it will be seen that the width is relatively small at the rear ends of the screws 250, 252, but increases to a wider width at the forward ends of the screws. As indicated previously however, the width may be constant throughout the length of the screws, or could narrow from the rearward ends to the forward ends thereof.

The screws 250, 252 can be oriented parallel, when cylindrical screws are used, or can be oriented so that their respective center axes are at a converging angle relative to each other, with an included angle that may range from about 1-8°.

During operation, the mixture to be separated is passed into and through the extruder device 300. The screw assembly 222 is rotated so as to co-rotate the screws 250, 252, usually at a speed of from about 20-1,200 rpm. Pressures within the extruder are usually at a maximum just adjacent the outlet die, and usually range from about 300-20,000 psig, more preferably from about 1,000-10,000 psig. Maximum temperatures within the extruder normally range from about 40-500° C.

Extrusion conditions are created within the device 300 so that the product emerging from the extruder barrel usually has a higher solids content than the product fed into the extruder. The preferred solids content to be achieved in biofuel production from lignocellulosic biomass to be achieved with the separation device of this disclosure is above 50%.

During passage of the extrudable mixture through the barrel 216, the screw assembly 222 acts on the mixture to create, together with the endmost die 240, the desired pressure for separation. It has been found that a wide variety of solid/liquid mixtures may be separated using the equipment of the invention; simply by changing the rotational speed of the screw assembly 222 and, as necessary, temperature conditions within the barrel, which means merely by changing the operational characteristics of the apparatus.

An exemplary embodiment of a solid/fluid separation module 300 in accordance with the invention is shown in FIGS. 4A, 4B, 5 and 6, while parts of the module will be discussed with reference to FIGS. 7 to 20. The exemplary module is capable of withstanding very high internal pressure forces (up to 20,000 psig) due to the use of internal fluid collection chambers.

As can be seen from FIG. 4A, showing a first embodiment of the separation module 600, the module includes the mounting plates 630, 632 for connection to adjacent barrel blocks 500, 520 with bolts 129 and a block filter unit 301 with front and back end plates 321, 322 and intermediate filter plates 314 (see FIG. 10A) stacked between the end plates and compressed therebetween into a filter plate stack 310 by alignment bolts 316. The filter unit 300 is clamped between the mounting plates 630, 632 by connecting rods 640. The mounting plates 630, 632, end plates 321, 322 and filter plates 314 each have a core opening 112 and all plates are aligned in the block filter unit 301 to define the core passage 248 (see FIG. 2). Both end plates 321, 322 include a seal groove 390 for receiving part of the seal 652 inserted between the mounting plate and end plate at each end of the block filter unit 301. The seal 652, preferably an O-ring, is compressed when the separation module 600 is clamped together by the connecting rods 640 to seal about the core opening 112. The separation module 600 of FIG. 4A is removed from the separation apparatus 100 by disassembling the extruder barrel 212 (see FIG. 1).

Figure 4B:
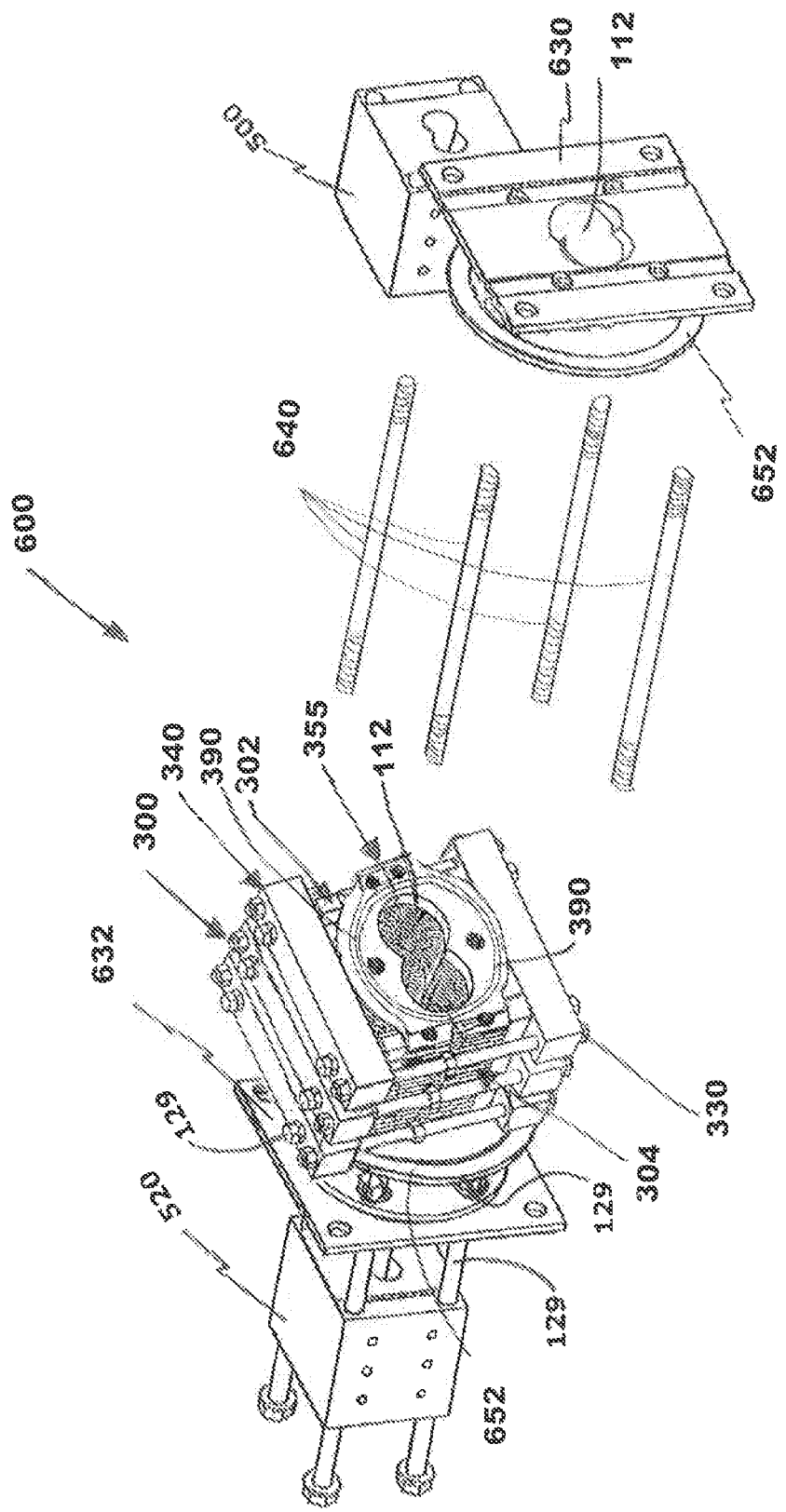
FIG. 4b schematically illustrates an embodiment of a split filter unit in accordance with the invention in axially exploded view.

As can be seen from FIG. 4B, showing a second embodiment of the separation module 600, the module includes the mounting plates 630, 632 for connection to adjacent barrel blocks 500, 520 with bolts 129 and a split block filter unit. 300. When comparing the block filter unit 301 and the split block filter unit 300, it is apparent that the split block filter unit 300 is split into upper and lower (or first and second) filter blocks 302, 304, respectively constructed in the illustrated exemplary embodiment as plate packs 310 and 320. Moreover, the end plates 305, 306 are split into front end plate sections 311, 321 and back end plate sections 312, 322 (see FIGS. 8 and 9). In addition, the filter plates 314 are split into upper and lower split plate sections 314a. The split block filter unit 300 is clamped between the mounting plates 630, 632 by connecting rods 640. The filter blocks 302, 304 are joined along a plane of symmetry of the core passage 248 (see FIG. 2) and clamped together by a clamping structure to form a clamped block 355. The clamping structure includes upper and lower clamping arrangements 340 and 330 to form the split block filter unit 300. All split end plates 311, 321, 312, 322 include a seal groove 390 for receiving part of the seal 652 inserted between the mounting plate and end plate at each end of the block filter unit 301. The seal 652, preferably an O-ring, is compressed when the separation module 600 is clamped together by the connecting rods 640 to seal about the core opening 112. In accordance with a key aspect of this second embodiment, the split block filter unit 300 can be installed into and disassembled from between the mounting plates 630, 632 while the mounting plates are integrated into the extruder barrel 212 (FIG. 1) and while an extruder screw extends, or extruder screws extend, through the extruder barrel. This is best understood from FIG. 5.

For removal of the split block filter unit 300, the connecting rods 640 are removed to provide access to the split block filter unit 300 and to loosen the connection between the mounting plates and the split block filter unit 300. Then, the upper and lower clamping arrangements 340 and 330 are loosened and the bottom clamping arrangement is disconnected from the connecting rods 347. Once disconnected, the bottom clamping arrangement 330 will fall down together with the lower filter block 304, here the plate pack 320. The upper clamping arrangement 340, the upper filter block 302, here the plate pack 310, and connecting rods 347 remain seated between the mounting plates 630, 632, supported by the extruder screws (not shown). Removal of the upper clamping arrangement 340 and the connecting rods 347 upward from between the mounting plates 630, 632 will allow access to the upper filter block 302, here the plate pack 310, which can then also be removed. The upper and lower filter blocks 302, 304 in the form of plate packs 310, 320 can then be disassembled, cleaned, reassembled and reinstalled, or simply replaced. Assembly of the split block filter unit 300 about the extruder screws and in between the mounting plates 630, 632 will occur in reverse order, starting with the upper filter block 302. During assembly, a pair of seals 350 is positioned between the filter blocks 302, 304 for sealing of the filter blocks about the extruder screws to seal the core passage.

The upper and lower filter blocks 302, 304 can each independently be a solid block, a solid block with drilled filtering passages, or a stacked block as discussed in more detail below in relation to FIGS. 7-9, as long as at least one of the filter blocks includes at least one filtering passage. In the exemplary embodiment illustrated in FIGS. 5-9, both filter blocks 302, 304 are stacked blocks 310, 320, as will be discussed in more detail below.

Figure 5:
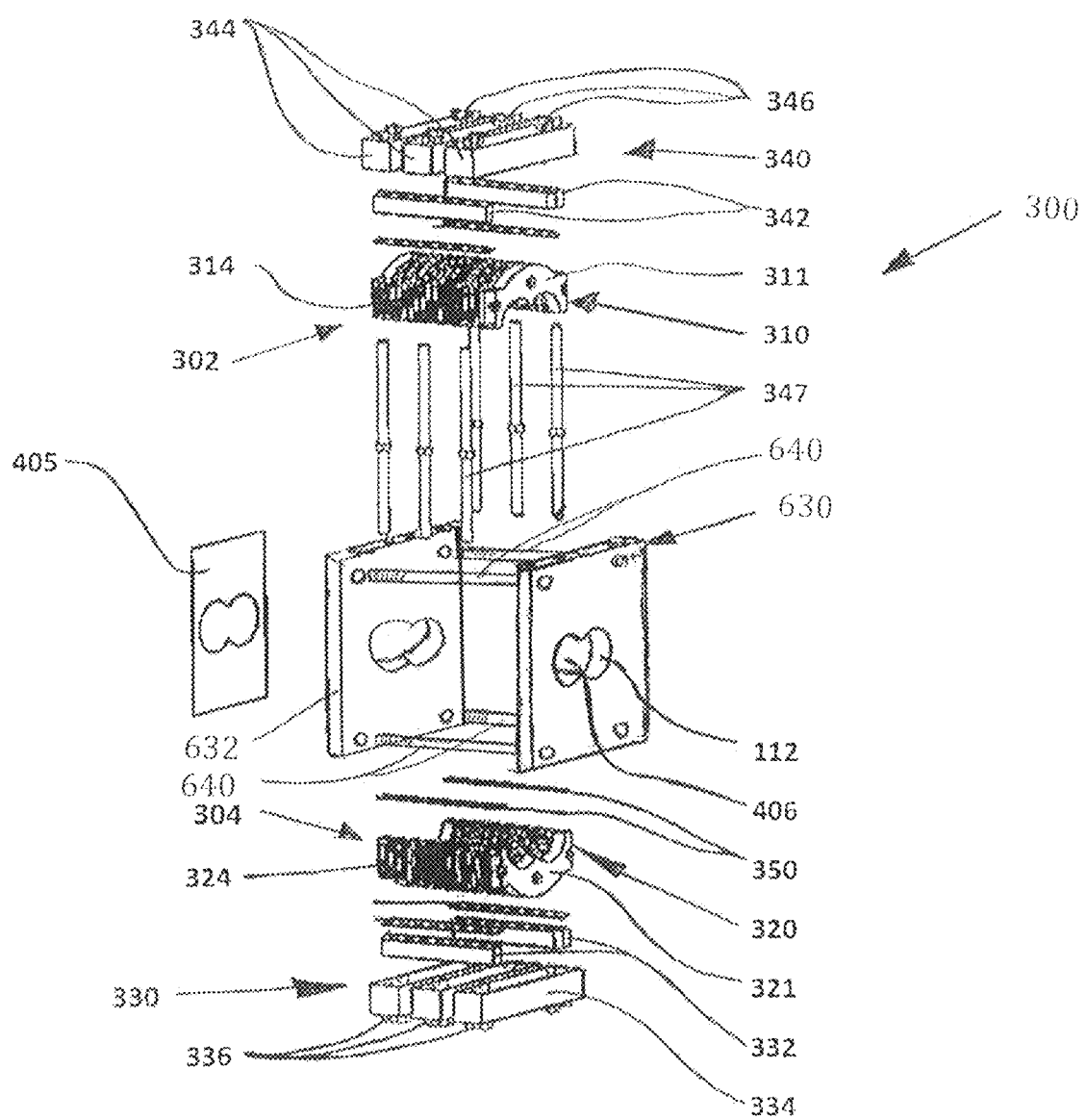
FIG. 5 illustrates the split filter unit of FIG. 4a in vertically exploded view.
Figure 6:
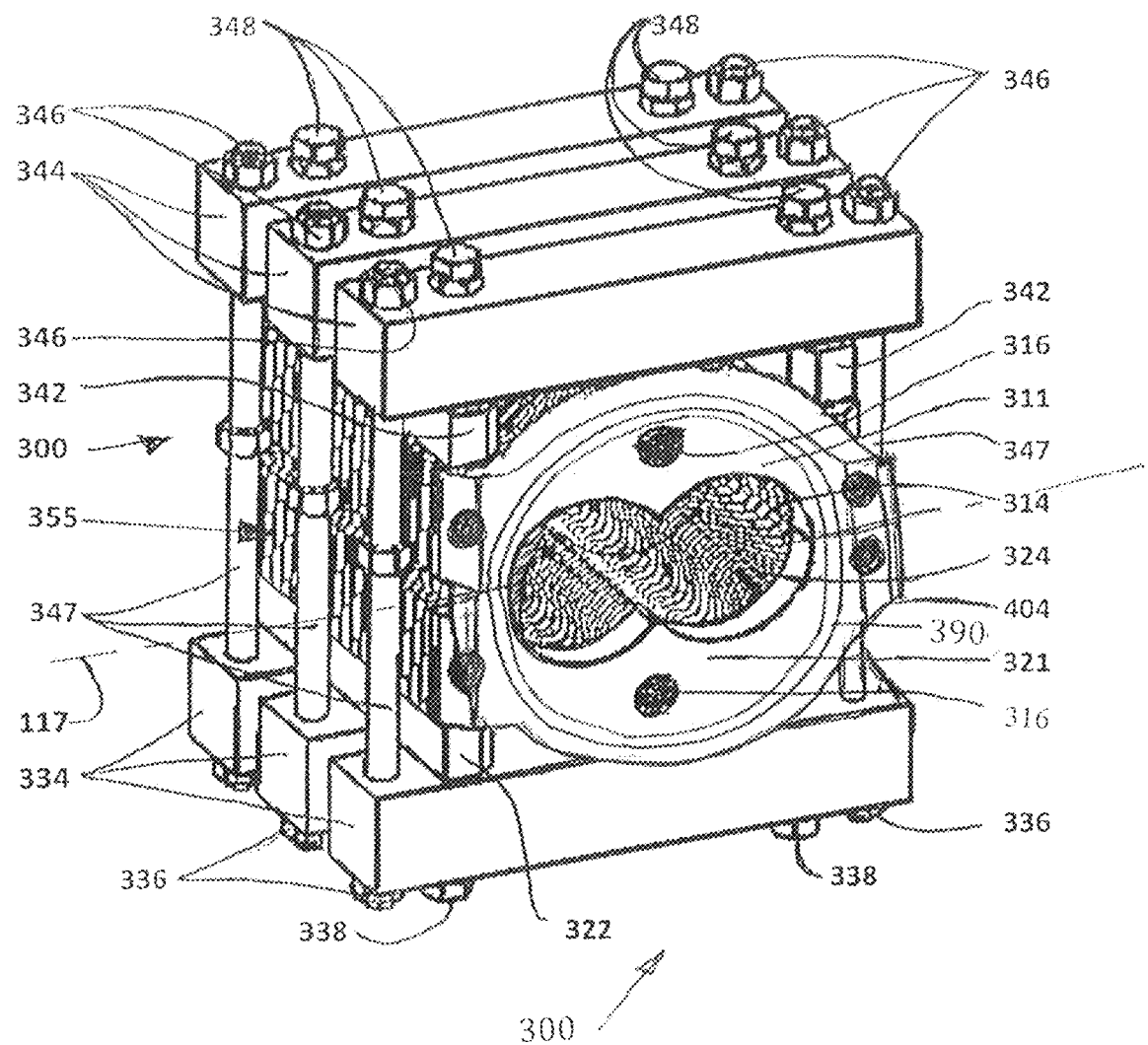
FIG. 6 illustrates a perspective end view of the split filter unit of the separation module of FIGS. 4a and 5.

The upper and lower clamping arrangements 340, 330 of the clamping structure as illustrated in detail in FIGS. 5 and 6, each include two or more parallel clamping bars 344, 334, which are spaced apart to allow the passage therebetween of fluids separated by the split block filter unit 300. The clamping bars 344, 334 are maintained in a fixed, spaced apart relationship by bridging bars 342, 332 to which the clamping bars are bolted by bolts 348, 338 (FIG. 6) and which rest against a pair of lateral clamping shoulders of the stacked blocks formed by the clamping edges 323b (FIG. 10B) of the barrel plates and end plates in the stacked block. The upper and lower clamping arrangements 340, 330 are connected with one another about the extruder screws and filter blocks 302, 304 to allow for the clamping of the filter blocks against one another, thereby sealing the filter blocks about the extruder screws. The upper and lower clamping arrangements 340, 330 are connected by way of connecting rods 347 which extend past the filter blocks 302, 304. The upper and lower clamping bars 344, 334 are bolted to the connecting rods by bolts 346, 336. The assembly of the upper and lower clamping arrangements 340, 330 as described includes separate clamping bars 344, 334 and bridging bars 342, 332. This construction provides a modular approach, allowing longitudinal elongation or shortening of the clamping arrangements by simply adding or removing clamping bars and using longer or shorter bridging bars. In the alternative, the upper and lower clamping arrangements 340, 330 can respectively made in one piece.

The embodiment of FIGS. 4a-6 can be used with extruders of smaller barrel diameter in which one can physically slide the barrel sections apart and tighten them back together. In larger diameter extruders, for example 3 inch or larger, the barrel sections are fixed in place and moving them apart is physically impossible so that another manner of incorporating the split filter unit into the barrel must be found. An exemplary separation module 200a for use in such extruders is illustrated in FIGS. 21-24. As can be seen from FIG. 21, the separation module 200a includes a frame 100, a split block filter unit 300 essentially identical with the split block filter unit 300 of FIGS. 4a-6 and a sealing arrangement 400 for sealably fastening the split filter block 300 in the frame 100 about the conveyor screws (not shown). The frame 100 is sized and constructed to form a barrel section for the large diameter extruder and is fixed in place together with the other barrel sections of the extruder. For that purpose, the frame 100 includes left and right side walls 101, 102, front and back walls 103, 104. The walls 101-104 form a rectangular box which is integratable into the barrel of the large diameter extruder through bolts (not shown) engaging threaded blind bores 108 in the front and rear edges of the side walls 101, 102 and in the front and rear walls 103, 104. The frame may include lids 105, 106 to close off the frame and convert it into a housing for added protection of the filter unit 300. Those lids may be hingedly or otherwise attached to one of the walls 101, 102, 103, 104 of the frame to reduce the risk of the lids being misplaced during assembly or disassembly of the filter unit 300. Front and rear walls 103, 104 include a core opening 112 for accommodating the extruder screws (not shown) of the large diameter extruder. The filter blocks 302a, 304a are joined along a plane of symmetry of the core opening 112 and clamped together by a clamping structure to form a clamped block 355. The clamping structure includes upper and lower clamping arrangements 340 and 330 to form the split block filter unit 300. Since the barrel sections in the large diameter extruder cannot be moved apart, the split block filter unit 300 can be installed into and disassembled from the frame 100 while the frame remains integrated into the extruder barrel 21 (FIG. 1) and while an extruder screw extends, or extruder screws extend, through the extruder barrel. This is best understood from FIGS. 22-24.

Referring to FIGS. 21 to 24, the locking arrangement 400 functions to lock the filter unit 300 in the frame 100 between the front and back walls 101, 102 and seal the throughgoing core passage 112 within the filter unit 300. The locking arrangement 400 includes an externally threaded cylindrical base sleeve 406 attached to, or integrated into, one of the front and back walls 101, 102 in concentric alignment with the core passage 112, a threaded cap nut 404 threadedly engageable with the base sleeve, a circular seal 402 for placement between the cap nut 404 and the clamped block 355 and a flat seal 405 for placement between the clamped block 355 and the other of the front and back walls 101, 102 to which the base sleeve 406 is not attached. Threading of the cap nut 404 onto the base sleeve 406 increases the spacing between the cap nut and the opposing end wall of the housing 100, while unthreading decreases this spacing. Thus, the cap nut 404 is fully threaded onto the base sleeve 406 for installation and removal of the clamped block 355 of the filter unit 300. For sealing of the filter unit 300 in the frame, the cap nut 404 is unthreaded until the clamped block is tightly pressed between the cap nut 404 and the opposing end wall of the frame (see FIGS. 22 and 23). Although the use of a rotatable locking arrangement as illustrated in FIGS. 21 to 24 provides for an easy locking in and unlocking of the clamped block from the frame, any other locking structure useful for reliably locking the clamped block in the frame while sealing the core passage can be used. For example, a pair of opposing wedges (not illustrated) with an opening or slot for accommodating the core opening may be used, in place of the base sleeve 406 and cap nut 404, to wedge the clamped block in the frame. One of the wedges can be attached to, or integrated into one of the front and back walls 101, 102 for ease of locking and unlocking.

For removal of the split block filter unit 300, upper and lower lids 105, 106 of frame 100 (if included) are removed to provide access to the split block filter unit 300. The filter unit sealing arrangement 400 (FIGS. 22-24) is loosened to unlock the filter unit 300 in the frame. Then, the upper and lower clamping arrangements 340 and 330 are loosened and the bottom clamping arrangement is disconnected from the connecting rods 347. Once disconnected, the bottom clamping arrangement 330 will fall out of the frame 100 together with the lower filter block 304, here the plate pack 320. The upper clamping arrangement 340, the upper filter block 302, here the plate pack 310, and connecting rods 347 remain seated in the frame, supported by the extruder screws (not shown). Removal of the upper clamping arrangement 340 and the connecting rods 347 upward from the frame 100 will allow access to the upper filter block 302, here the plate pack 310, which can then also be removed from the frame. The upper and lower filter blocks 302, 304 in the form of plate packs 310, 320 can then be disassembled, cleaned, reassembled and reinstalled, or simply replaced. Assembly of the filter unit 300 about the extruder screws and in the frame 100 will occur in reverse order, starting with the upper filter block 302. During assembly, a pair of seals 350 is positioned between the filter blocks 302, 304 for sealing of the filter blocks about the extruder screws to seal the core passage 112 from the collection chamber 110.

Figure 7:
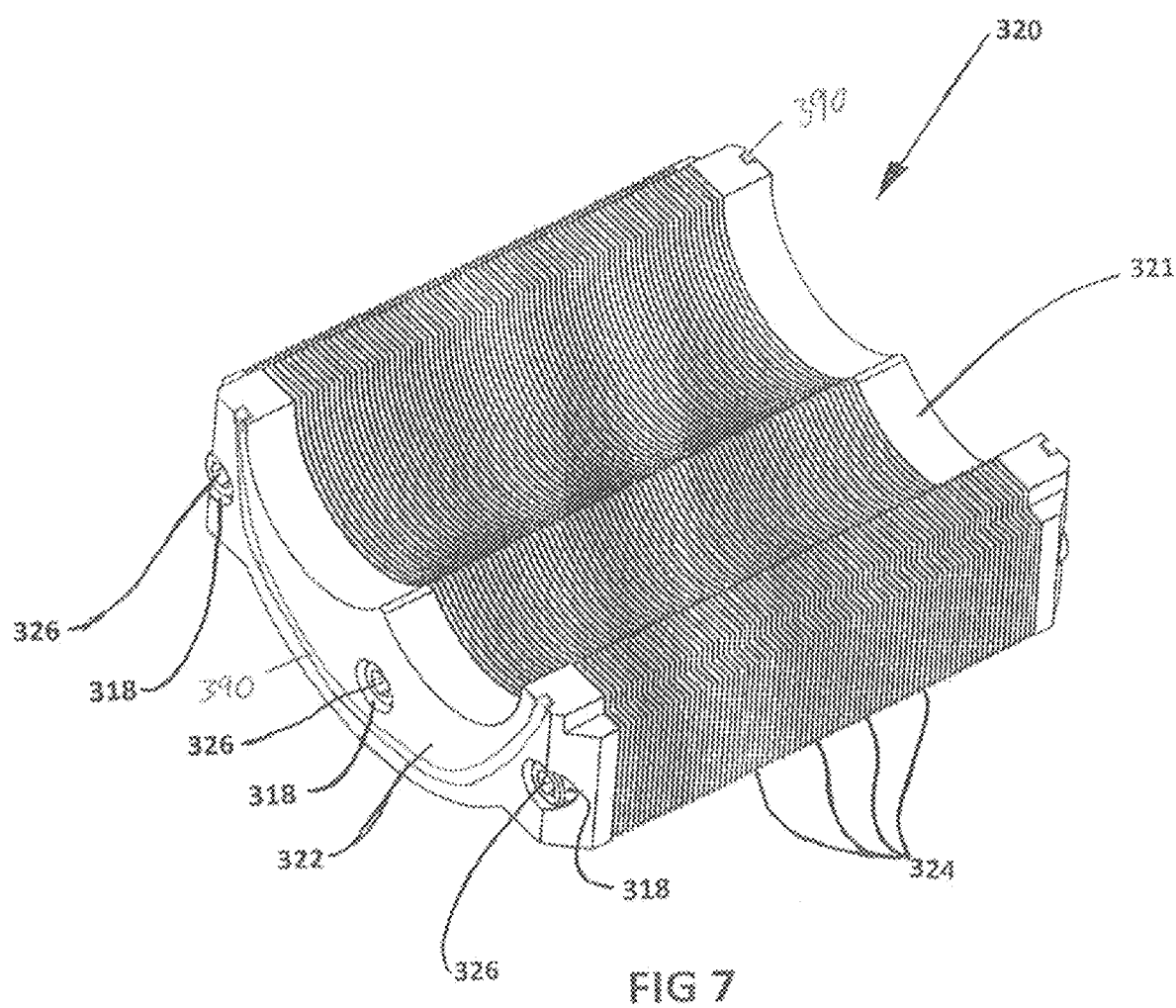
FIG. 7 is a perspective view of a lower filter block of the split filter unit of FIG. 6.
Figure 8:
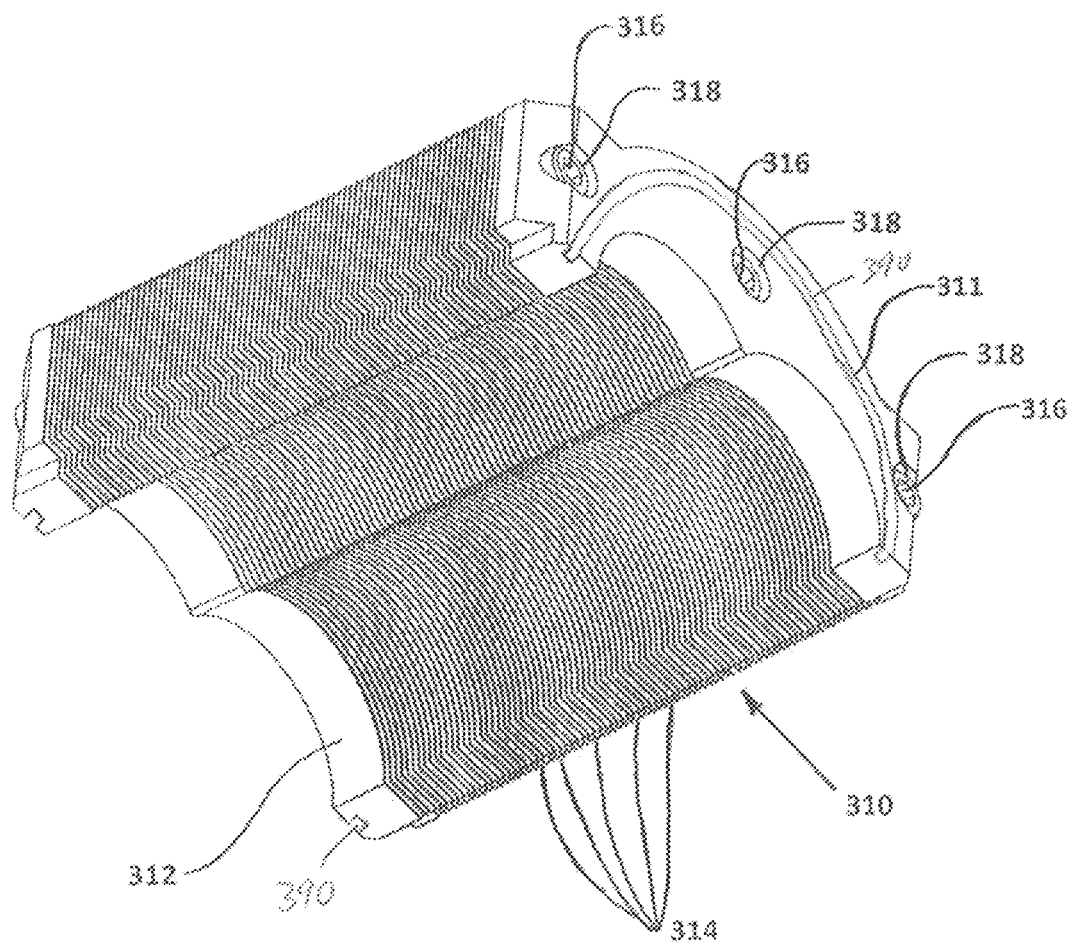
FIG. 8 is a perspective view of an upper filter block of the split filter unit of FIG. 6.

The lower and upper stacked blocks 310, 320 as illustrated in separation in FIGS. 7, 8 and 9, are assembled from barrel plate sections 314a, end plate sections and a stacking structure. The end plate sections include front end plate sections 311, 321 and back end plate sections 312, 322. The stacking structure includes alignment rods 317 (FIG. 9) and alignment bolts 316. The barrel plate sections 314a are preferably mirror image to one another along the plane of symmetry, so that a single type of barrel plate section 314a (see FIG. 10B) can be used for either stacked block. The barrel plate sections 314a include alignment bores 325 for the alignment rods 317 as shown in FIG. 9, which shows the lower filter block 304 in exploded view. In the exemplary embodiment of a lower stacked block 310 as shown in FIG. 9, a plurality of barrel plate sections 314a are compressed between front and back end plate sections 321, 322 having the same basic overall outline as the barrel plate sections 314a but being much thicker for even compression of the plate pack. The front and back end plate sections 321, 322 include the same alignment bores 325 as the barrel plate sections 314a and recesses 318 for the bolts 316. The alignment rods 317 in combination with clamping bolts 316 recessed into the front and back end plate sections 321, 322 are used to clamp the plate pack between the end plates 321, 322 to seal the barrel plate sections 314a together and form the lower stacked block 310. The upper stacked block 320 is assembled in an identical manner using barrel plate sections 314a, front and back end plate sections 311, 312 (which can be identical to back and front end sections 322, 321 respectively), the alignment rods 317 and alignment bolts 316, whereby the end plate sections 311, 321, can be shaped mirror image to the end plate sections 321, 322.

Other arrangements for holding the barrel plates aligned and compressed in a plate stack can also be used. The alignment structure can also be integrated with the associated clamping arrangement (not shown) to allow handling of the upper and lower filter blocks 310, 320 together with the respectively associated clamping arrangement. One or more of the barrel plate sections 314a in the upper and lower stacked blocks 320, 310 can be constructed as a filter plate. The detailed construction of such a filter plate will be discussed in more detail below in reference to FIGS. 10A and 10B.

As illustrated in FIGS. 4, 5 and 7-9, the split block filter unit 300 includes barrel plate sections 314a which, when stacked and clamped in the split block filter unit 300, define a portion of the core passage 248 extending through the barrel 212 of the separating apparatus 100 (see FIG. 2). The core passage 248 has one, two or more longitudinal axes, equal in number to the number of extruder screws housed in the core passage.

Figure 10A:
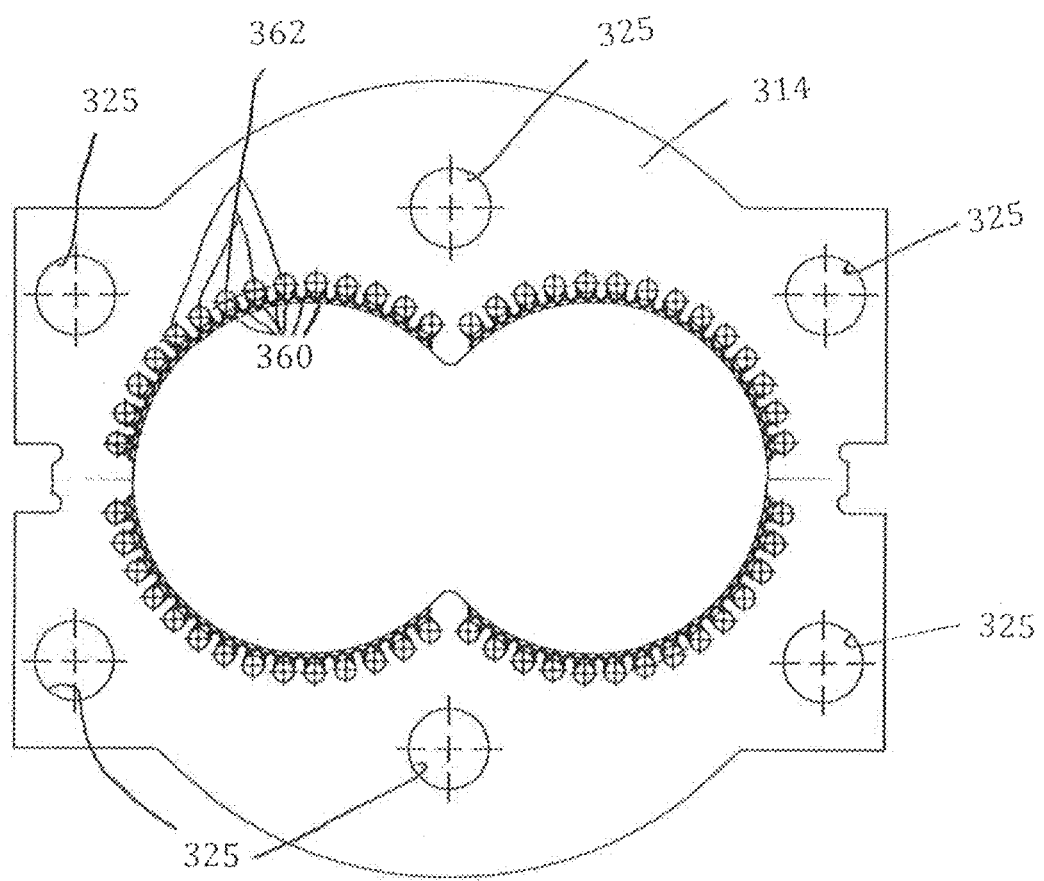
Figure 10B:
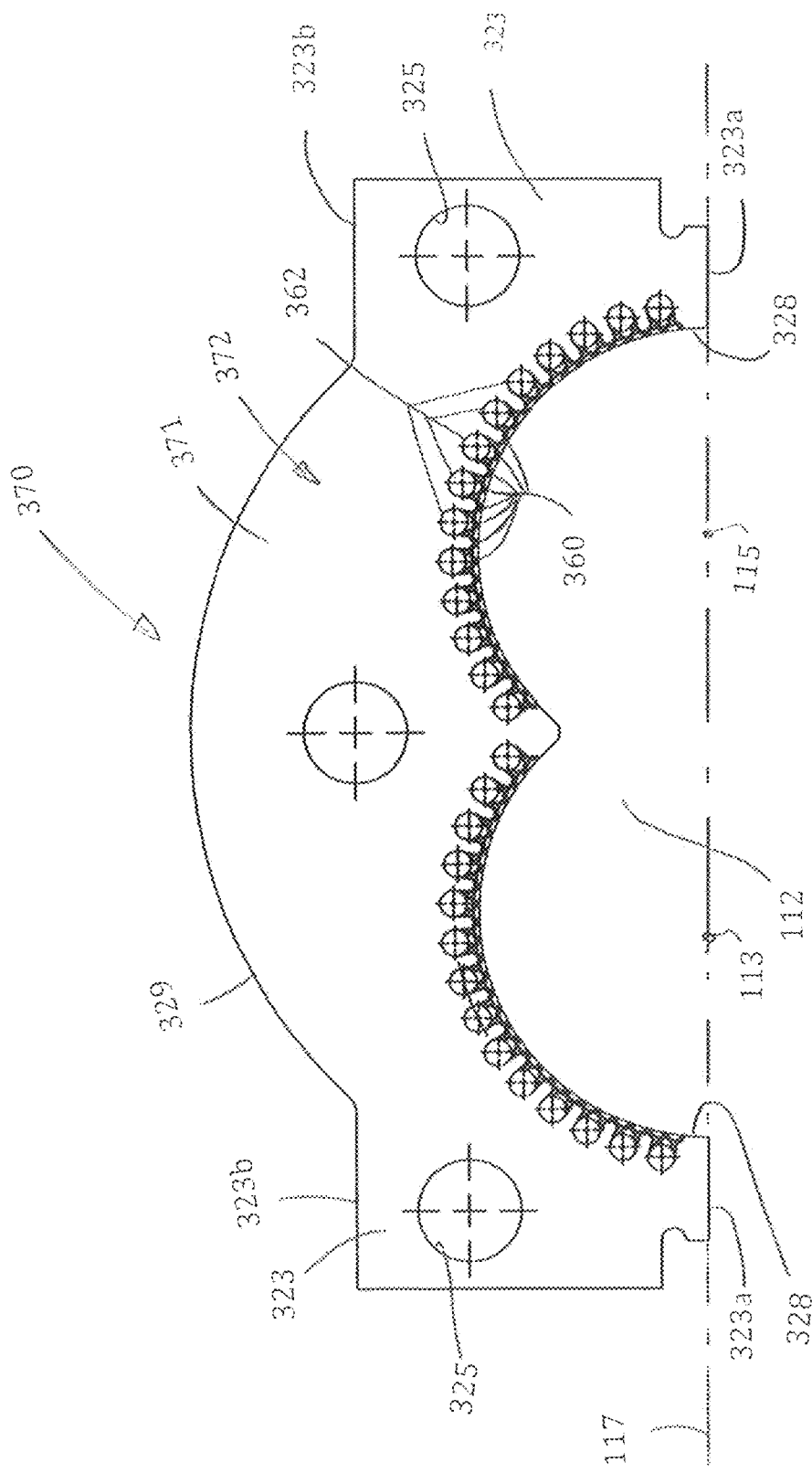
FIG. 10b is an axial plan view of an exemplary split filter plate for inclusion in the upper or lower filter plate stack of FIG. 7 or 8.

The block filter unit 301 is made of stacked barrel plates in an manner similar to that disclosed in U.S. Application US 2012/0118517. In the block filter unit 301, the barrel plates 314 are continuous about the core opening (see FIG. 10A) and therefore cannot be removed from about the conveyor screw, but must be pulled off the conveyor screw, or disassembled from the filter press until the conveyor screw has been removed. To enable removal of the stacked barrel plates from the filter press without removal of the extruder screws, the split block filter unit 300 is used. The split block filter unit 300 is achieved by splitting the full barrel plates 314 into first and second halves along a plane of symmetry extending through each longitudinal axis of the core opening 112, or by building separate split block halves from barrel plate sections designed to form half of the core opening. The latter approach is more advantageous, since it allows for the simplification of the barrel plate sections and the stacked block structure, as will be discussed below. The barrel plates can be divided along the plane of symmetry 117 of the core opening 112, which plane extends through the two longitudinal axes 113, 115 into upper split plates 314 and lower split plates 324 (FIG. 6). Alternatively, rather than splitting full plates, separate upper and lower barrel plate sections can be separately produced, which barrel plate sections can be different in design, or of mirror image design as shown in FIGS. 7, 8 and 9. Making the upper and lower barrel plate sections 314a of mirror image design makes is possible to use a single type of universal filter plate 370 as shown in FIG. 10B, which can be used for both the upper and lower barrel plate packs 310, 320.

The single design, universal barrel plate 370 includes a body 371 with flat front and rear faces, an inner edge 328 extending between the front and rear surfaces, an outer edge 329 extending between the front and rear surfaces and lateral tabs 323. The inner edge 328 defines exactly one half of the central core opening 112 located to one side of the plane of symmetry 117. The outer edge 329 is convexly curved to maintain a minimum body width between the inner and outer edges 328, 329. The lateral tabs 323 are provided for clamping of the universal barrel plate 370, when part of a stacked block, along the plane of symmetry 117 against the stacked barrel plates of a like stacked block. The universal barrel plates 370 when stacked in a stacked block each include a sealing edge 323a extending in the plane of symmetry 117 for engagement with the sealing edge of a like universal barrel plate 370 placed in mirror image on the opposite side of the plane of symmetry. The lateral tabs 323 each further include a clamping edge 323b extending parallel to the sealing edge 323a for engagement by one of the bridging bars 342, 332 (FIG. 6). The clamping edges 323b of the barrel plates 370 in a plate stack together form a clamping shoulder for engagement by one of the bridging bars 342, 332 of the upper and lower clamping arrangements 340, 330 respectively. The universal barrel plate 370 includes alignment bores 325 for receiving the alignment rods 317 as shown in FIG. 9. In the exemplary embodiment shown in FIG. 9, a plurality of universal barrel plates 370 is compressed into the lower stacked block 310 (the upper stacked block 320 being identical and simply used upside down) by the front and back end plate sections 321, 322. The alignment rods 317 in combination with clamping bolts 316 are used to clamp the plate pack between the end plates to seal the barrel plates 370 together and form the stacked block 310, 320.

In order to achieve a separation of fluids from a pressurized fluid/solids mixture in the core opening 112, one or more of the universal barrel plates 370 in the stacked block 310, 320 can be constructed as a universal filter plate 372 including one or more filter passages 360 which each define a fluid passage in the filter plate 372 extending away from the inner edge 328. The universal filter plate 372 further includes one or more drainage perforations 362 which are located within body 371, between the inner and outer edges 328, 329 and extend completely through body 371 from one face to the other. Each filter passage 360 extends all the way from the inner edge 328 to one of the drainage perforations 362. The filter passages 360 can be provided by cutting, scoring, etching or bending of the barrel plate sections 314a. Thus, the filter passage may be a slit cut completely through the universal filter plate 372 (not shown), a deformation of the body 371, or a scored or etched recess in one of the faces of the body 371. The exact manner in which the passage is created will not be further discussed herein, since not of particular significance to the present invention. Filter passages acid etched into a face of the filter plate 372 have proven advantageous, since acid etching allows for the manufacture of filter passages of much smaller cross-section than scored or cut through passages. If the filter passage 360 extends from the inner edge 328 to the drainage perforation 362 in the front surface of the filter plate, only one type of filter plate is needed, since when this filter plate is stacked one behind the other with other like filter plates, the back surface of one filter plate will always function as a cover for the filter passage 360 in the like filter plate immediately behind.

In one embodiment, each barrel plate 314, barrel plate section 314a, or universal barrel plate 370, is constructed as a filter plate to simplify the filter unit design and to maximize the filtering capacity of the filter unit. To maximize the porosity of a stacked block, each filter plate includes the maximum number of filter passages 360 and drainage perforations 362 which can be included in the filter plate without harming the structural integrity and pressure retention capacity of the filter plate and of the stacked block in which it is included. To reduce manufacturing cost and facilitate assembly, all barrel plates used in the split block filter unit 300 a universal filter plates 372 of identical construction.

The number of barrel plates included in the separating module 600 can be adjusted according to the plate thickness and the desired filter porosity. In the illustrated embodiment of FIGS. 5 and 6, each stacked block 310, 320 included 300 universal filter plates 372 in a stack of 6 inch length, each plate being 0.020 inch thick, having 56 filter channels at a width of 0.04" and a depth of 0.005" and having an overall open area of 3.36 square inches. With the illustrated embodiment, a biomass of 30% dry matter content was squeezed and dried to a 48% dry matter content at barrel pressures of about 300 psig. In another embodiment, each stacked block 310, 320 may include 200 universal filter plates 372 per inch of stacked length, each plate being 0.005 inch thick and having an overall open area of 0.864 square inches. With that embodiment, a dry matter content of 72% may be achieved at barrel pressures of about 600 psig. On a continuous basis, 100 g of biomass containing 40 g of solids and 60 g of water can be squeezed out in the filter module 300 using 600 psig internal force at a temperature of 100 C to obtain a dry biomass discharge (solids portion of the liquid/solid biomass) containing 39 g of suspended solids and 15 g of water. The filtrate obtained will contain about 95 g of water, which will be relatively clean and contain only a small amount (about 1 g) of suspended solids with a mean particle size equal to the pore size of the filter passages 360.

In the illustrated embodiment of the universal filter plate 372 of FIG. 10B, the filter passages 360 are in the form of a recess cut to a depth, which is only a fraction of the filter plate thickness, to minimize the effect of the recess on the structural integrity of the plate and to prevent warping or buckling of the plate during installation or operation as much as possible. Preferably, the recess has a depth, which is at most ⅓ of the plate thickness, more preferably ⅕ of the plate thickness, most preferably at most 1/10 of the plate thickness. Very small filter pores can be achieved in this manner by using very thin filter plates and very shallow recesses. For example, by cutting filter passages 360 of 0.05 inch width and 0.001 inch depth into the filter plate 372, a pore size of only 0.00005 square inch can be achieved. For even finer filtering, filter passages of 0.01 inch width can be used. The filter passage 360 can be produced, for example, by laser cutting or acid etching. In the illustrated exemplary embodiment, the filter plates 372 were made of 316 Stainless Steel and the passages 360 were cut by acid etching. A conventional photo lithography process can be used to define on the filter plate 372 the shape and pattern of the passages to be cut. The design, location and orientation of the passages 360 is preferably chosen to be mirror image to a center line of the filter plate 372 in order to allow use of the filter plates in a back to front or back to back stacking orientation. In the back to front orientation, the passages 360 are covered by the back face of the adjacent filter plate 372 and in the back to back orientation the filter plates 372 are stacked in pairs so that the filter passages of both plates in the pair line up with one another, resulting in double the filter pore size, at the same porosity.

Figure 11:
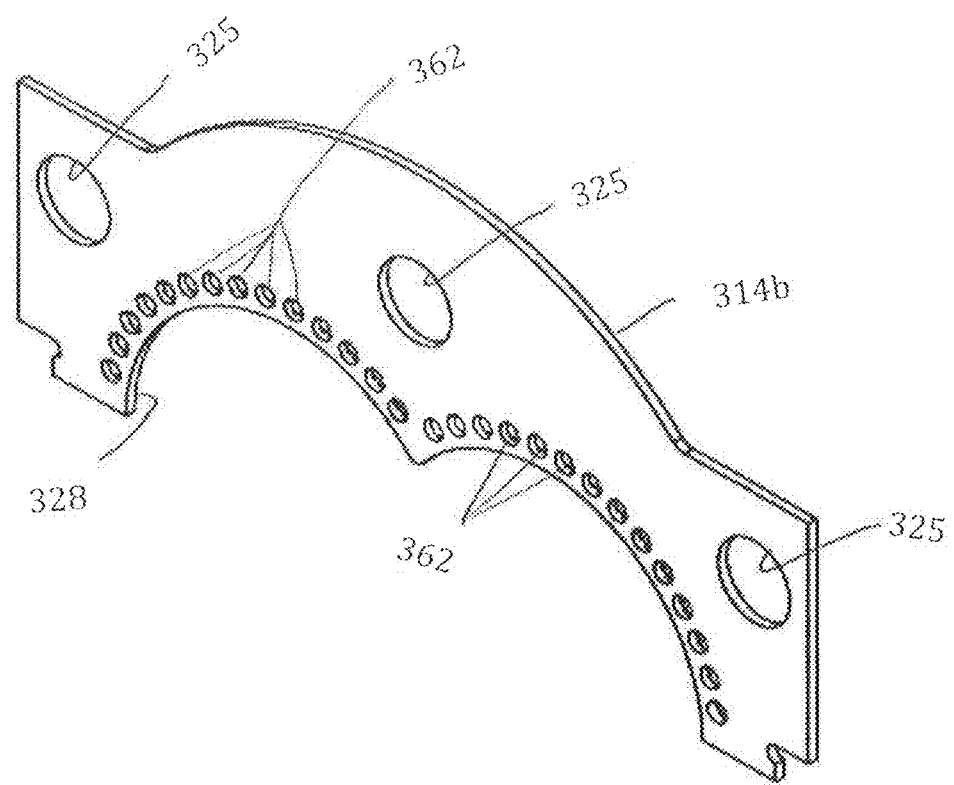
FIG. 11 is a perspective view of an optional compression plate as shown in the exploded filter plate stack of FIG. 9.
Figure 12:
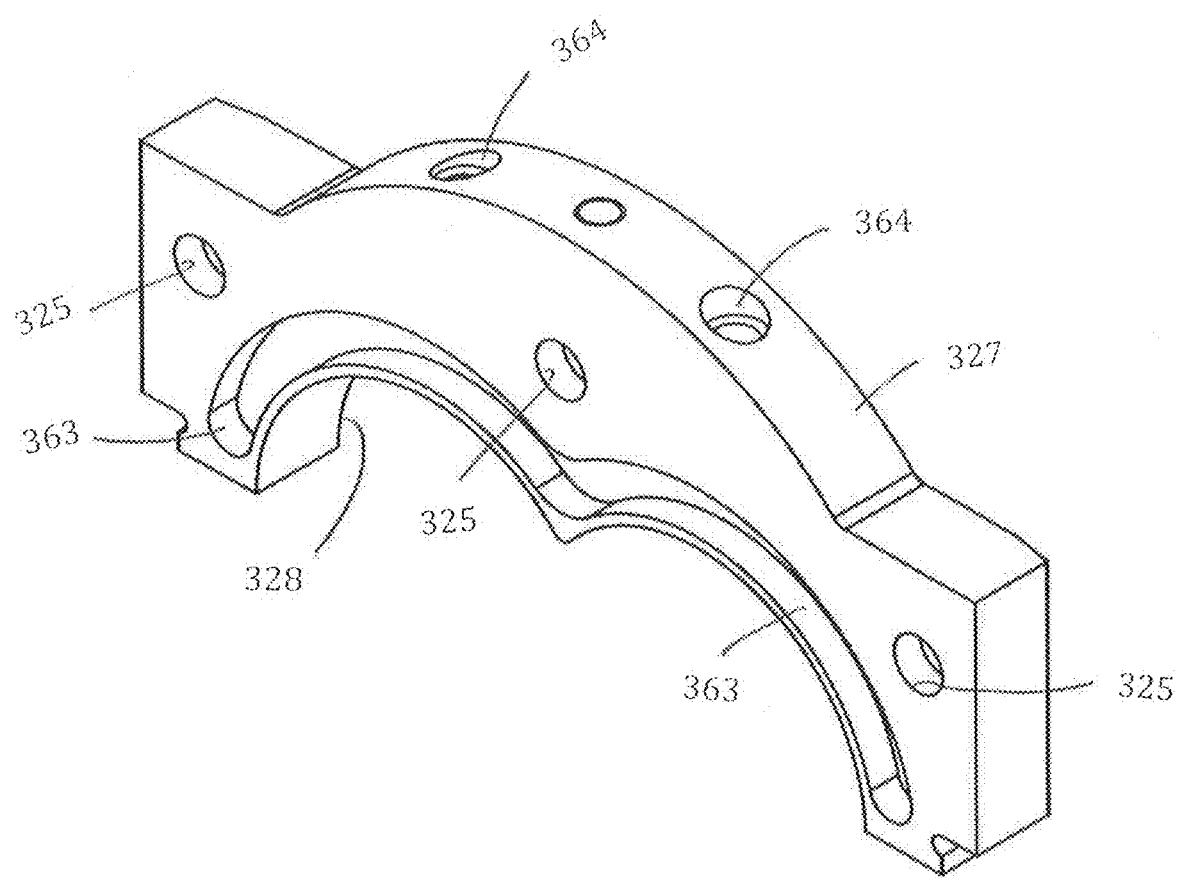
FIG. 12 is a perspective view of an end plate section, seen from the plate stack side.
Figure 13:
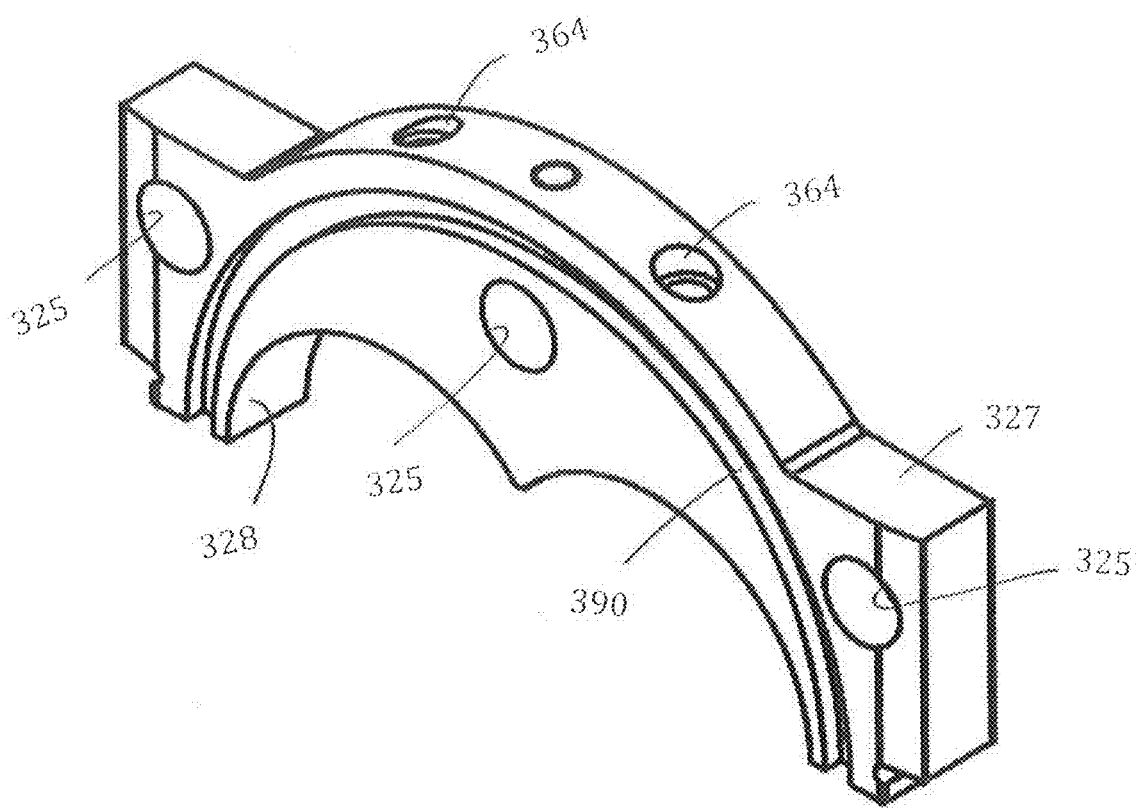
FIG. 13 is a perspective view of an end plate section seen from the mounting plate side.
Figure 14:
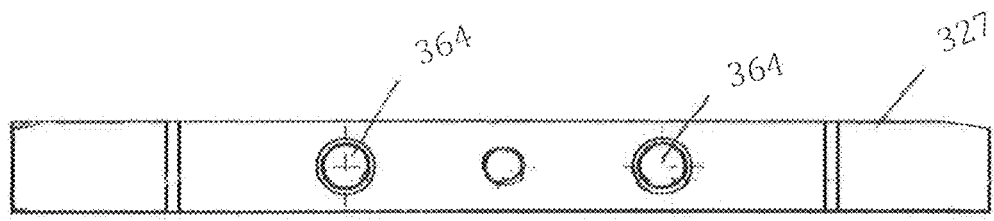
FIG. 14 is a top plan view of the end plate section of FIGS. 11 and 12.
Figure 15:
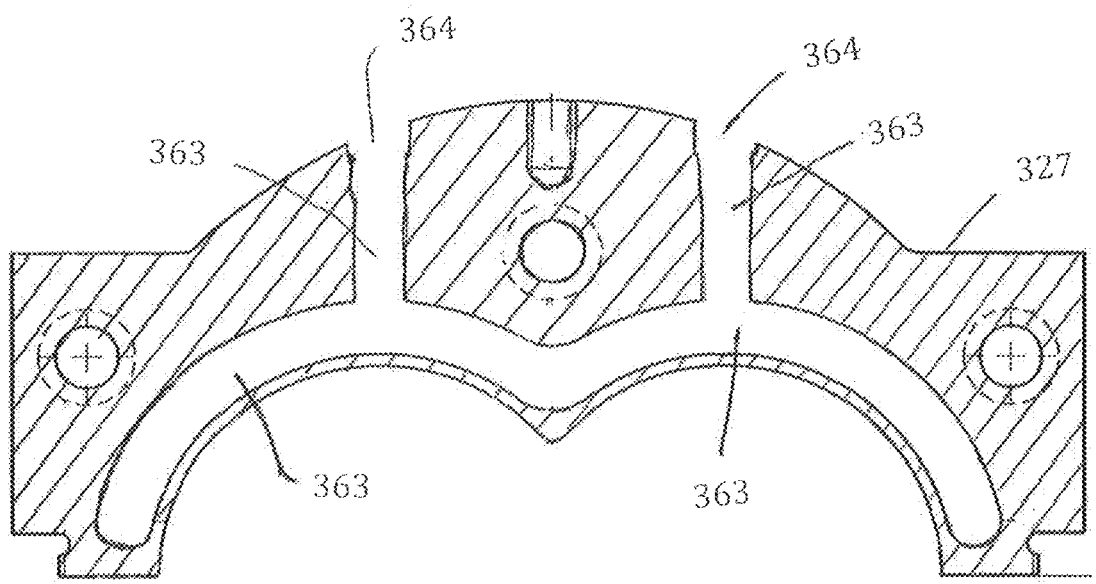
FIG. 15 is a cross-section through the end plate section of FIGS. 11 and 12.
Figure 16:
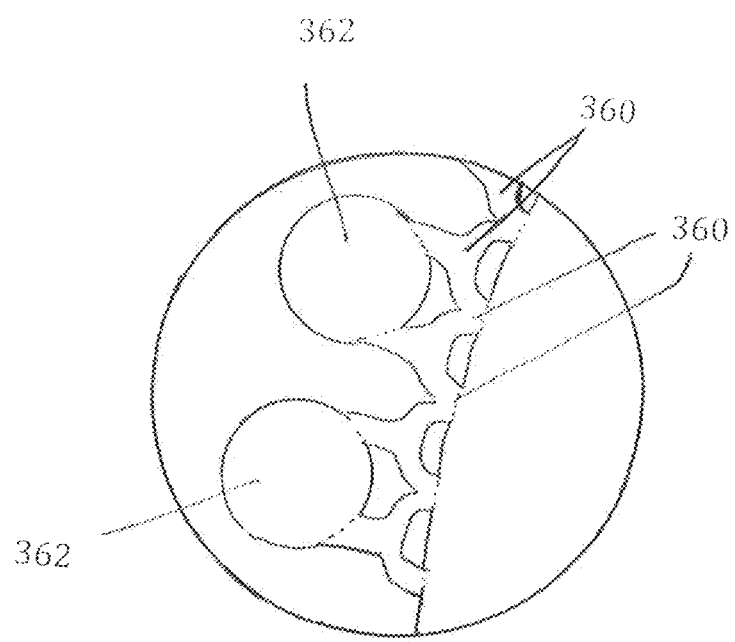
FIG. 16 is an enlargement of portion A of FIG. 10a or 10b.
Figure 17:
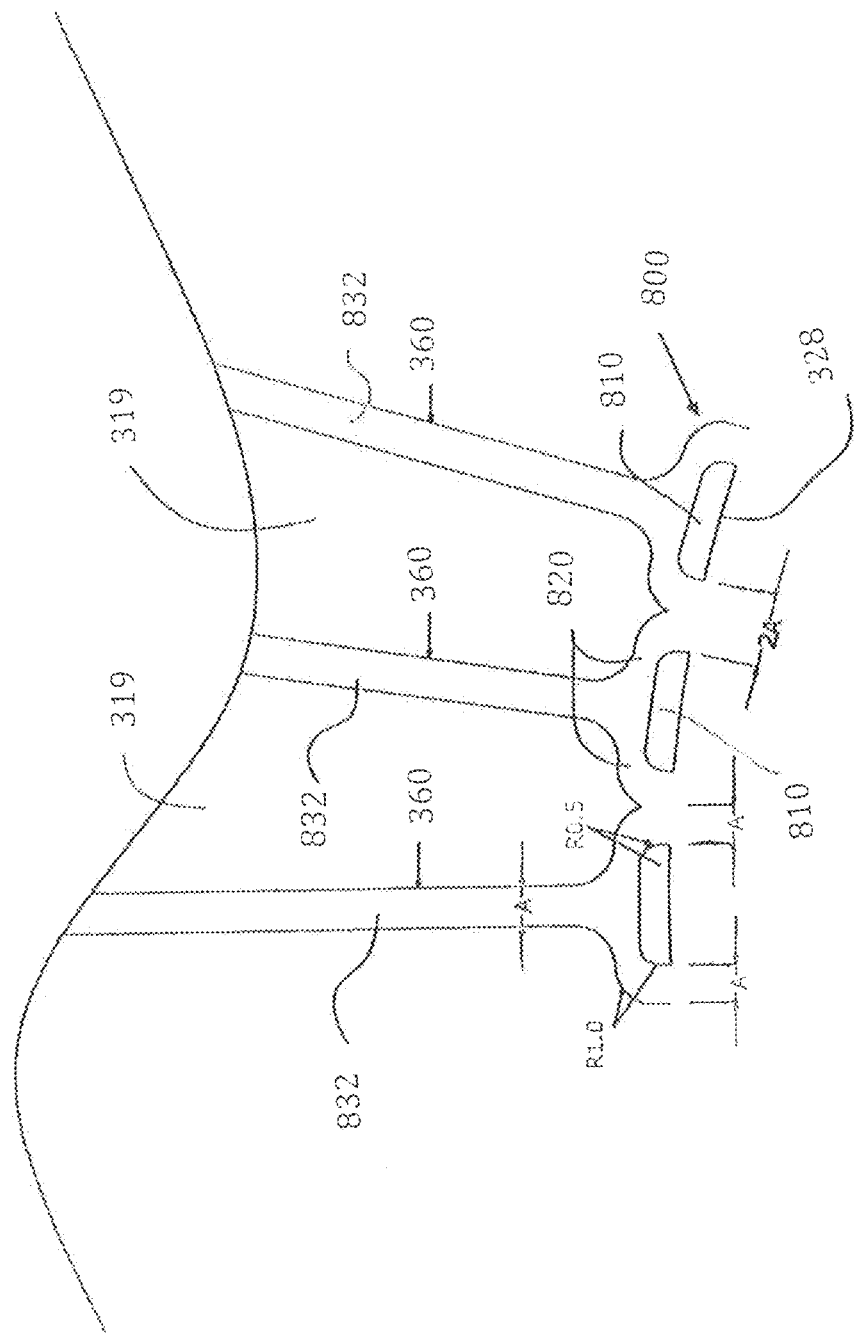
FIG. 17 is a variant of the enlargement of FIG. 16.

FIGS. 9 and 11 illustrate an optional compression plate 314b, which may be included in the plate stacks 310, 320 if very thin universal filter plates 372 are used and the drainage passage 363 in the end plate sections connects to multiple, or all collection chambers 338. The compression plate 314b is used to avoid deformation into the drainage passage 363 of the universal filter plate 372 adjacent the end plate section.

As illustrated in FIGS. 12 to 15, illustrating one embodiment of a universal end plate 327 includes the alignment bores 325, an inner edge 328 which defines part of the core opening 112 in the plate stack 310, 320 and an outer edge accessible when the end plate is incorporated into the separation module 600. On a face directed towards the filter plates, the universal end plate 327 includes the drainage passage 363 which is aligned with the drainage perforations 362 in the filter plates to allow draining of the collection chambers 338 formed by the drainage perforations in the plate stacks. The drainage passage has an outlet 364 on the outer edge. On a face directed towards the mounting plates in the separation module 600, the universal end plate 327 has a seal groove 390 for receiving part of the seal positioned between the filter unit 301, 300 and the mounting plates 630, 632 in the separation module 600.

The separation of liquid from an extrudable mixture including fibrous solids creates particular challenges for the filter construction. The fibers may enter into and align in parallel in the filter passages 360, causing a tight plug in the passage which not only reduces or prevents the passage of fluid, but may be very difficult, if not impossible, to remove by backwashing. This problem forms the basis of the embodiments of a filter passage 360 in accordance with the invention as illustrated in FIGS. 16 to 19E. To address the problem, the filter passages 360 may include a directional deflection 800, as illustrated in FIGS. 16 to 19E, at any point along their length to block any straight line path through the passage. This may be achieved with providing a S-shaped, or Z-shaped curve in the longitudinal extent of the passage or by including a fork or split in the passage, for example, T-shaped, V-shaped, Y-shaped or U-shaped splits. An exemplary deflection in the form of a U-shaped split is shown in FIGS. 16 to 19E. It is the purpose of the directional deflection 800 to impede a straight line passage through the filter passage 360, or a straight passage of a linear fiber. Thus, any directional deflection 800 in the filter passage 360 which is sufficient to block a straight line pass through the filter passage 360 can be used, irrespective of the shape of the deflection, or the location of the deflection along the longitudinal extent of the filter passage 360. In the embodiment illustrated in FIGS. 17 to 19E, the deflection 800 is advantageously located at the end of the passage 360 at the inner edge 328. In the U-shaped deflection 800 illustrated in FIGS. 16 to 19E, the filter passage 360 includes a recess 832 of a width of A, etched into the front surface 319 of the filter plate 372. The U-shaped split is created by branching the recess 832 into a pair of opposing branches 820 by curving the recess 832 in opposite directions at a radius equal to the width of the recess, in the illustrated embodiment a radius of 0.001 inches (1 micron). The branches 820 are then curved back to the original direction of the recess at the same radius, to create the U-shaped split. The portion of the front face 319 located between the inner edge 328 and the branches 820 creates a bumper 810 which blocks the straight line passage through the filter passage 360.

Figure 18:
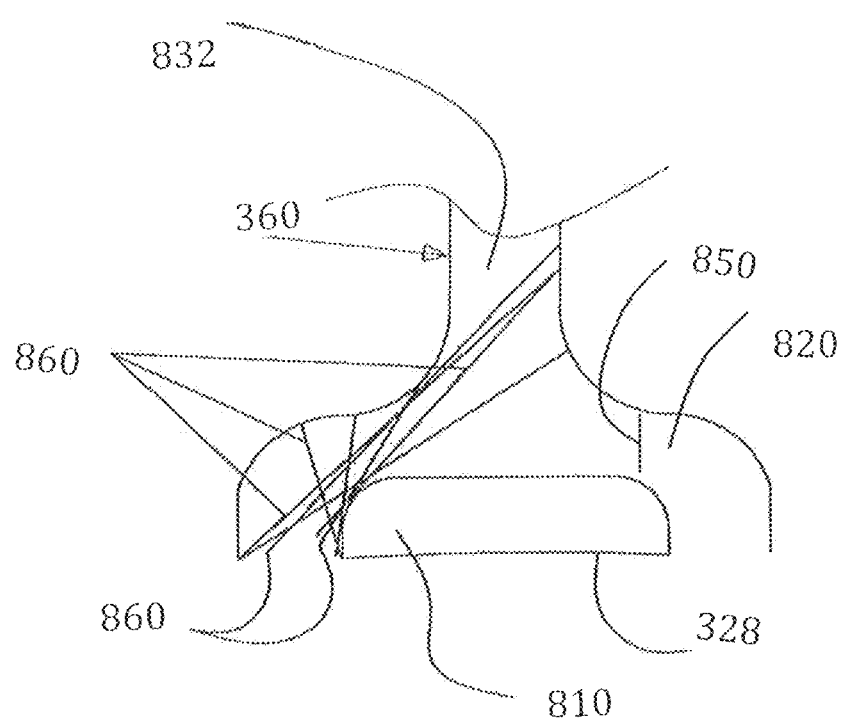
FIG. 18 is an enlargement of the intake end of an exemplary filter passage.

As illustrated in FIG. 18, short fibers 850, those having a length shorter than the width of the filter passage 360, may be able to pass the deflection 800, but are less likely to accumulate in and block the passage 360, since they are not long enough to jam in the passage. On the other hand, long fibers 860, those having a length greater than the width of the passage 360 will most likely jam in the deflection 800. Long fibers 860 that jam in the deflection 800, will jam at different depths and angles in the deflection 800, depending on the overall length of the long fibers 860. This results in a non-parallel, generally random orientation of the jammed fibers 860, similar to a random log jam in a tight turn of a river. This generally non-parallel orientation of the jammed fibers 860 prevents a complete plugging of the filter passage 360 at the deflection. At the same time, the fiber jam may create an additional filter layer, aiding in the retaining of superfine solids that would normally pass through the filter passage 360.

FIGS. 19A to 19E schematically illustrate other types of deflections in the filter passage 360, such as Y-shaped, V-shaped, T-shaped, S-shaped and Z-shaped deflections. The filtering passages 360 in the exemplary embodiments of FIGS. 16-19E may widen away from the deflection, for example from the deflection 800 to the drainage perforation.

Figure 20:
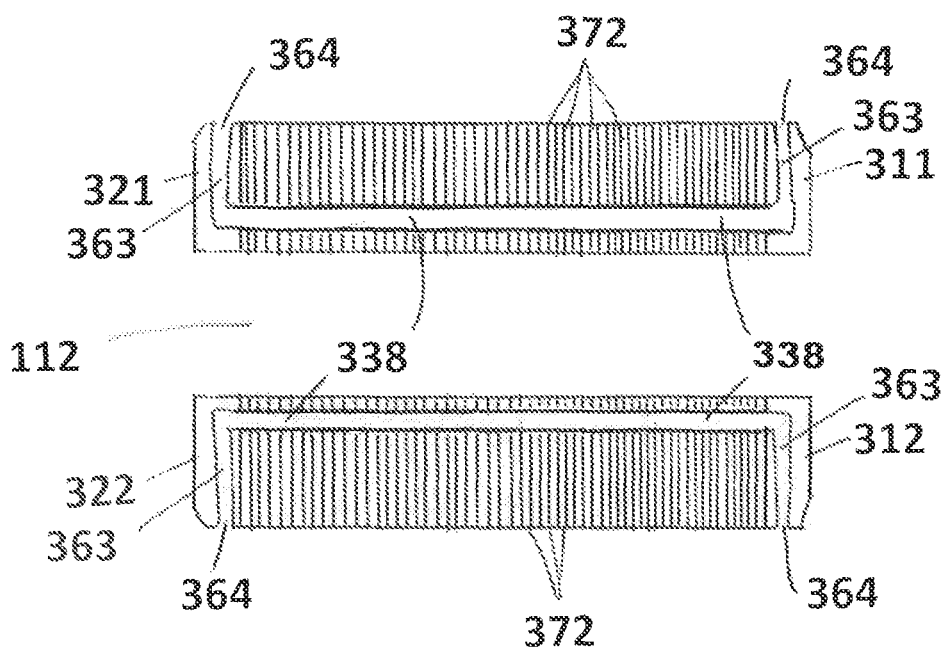
FIG. 20 is a cross-sections through the filter unit of FIG. 4B.
Figure 21:
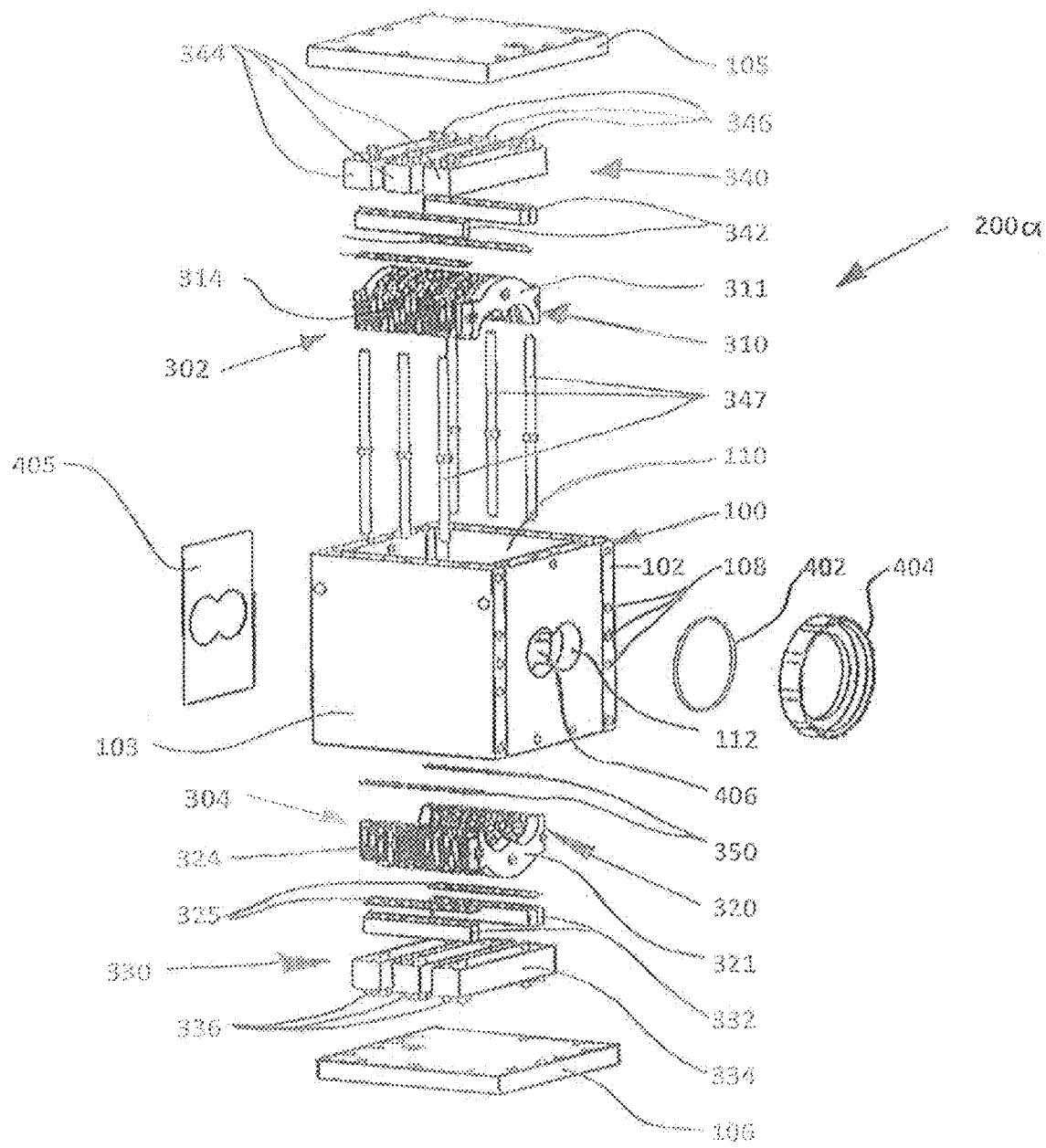
FIG. 21 is illustrates another embodiment of a solid/fluid separation module in exploded view.
Figure 22:
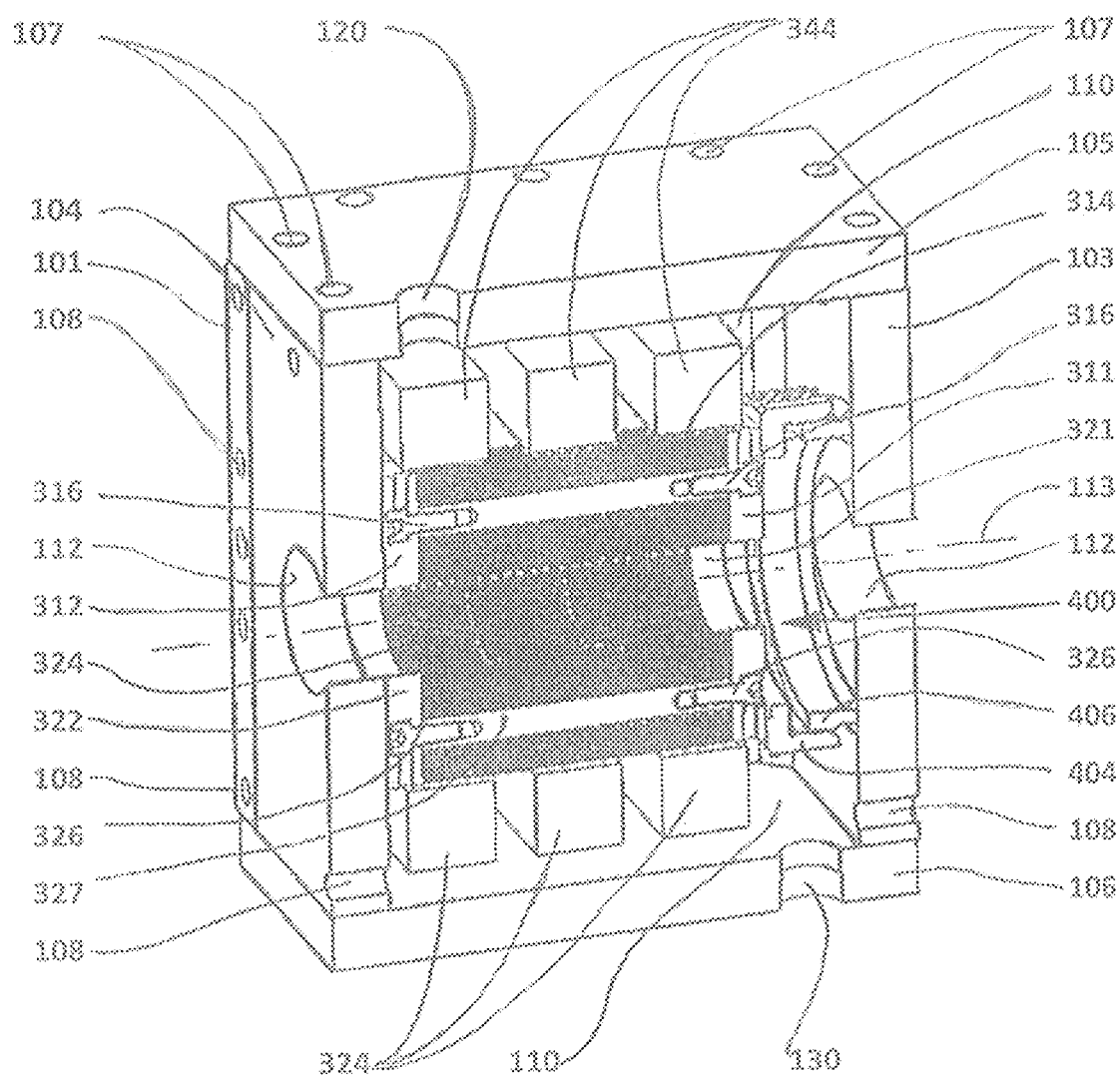
FIG. 22 shows a vertical cross-section through the solid/fluid separation module of FIG. 21.
Figure 23:
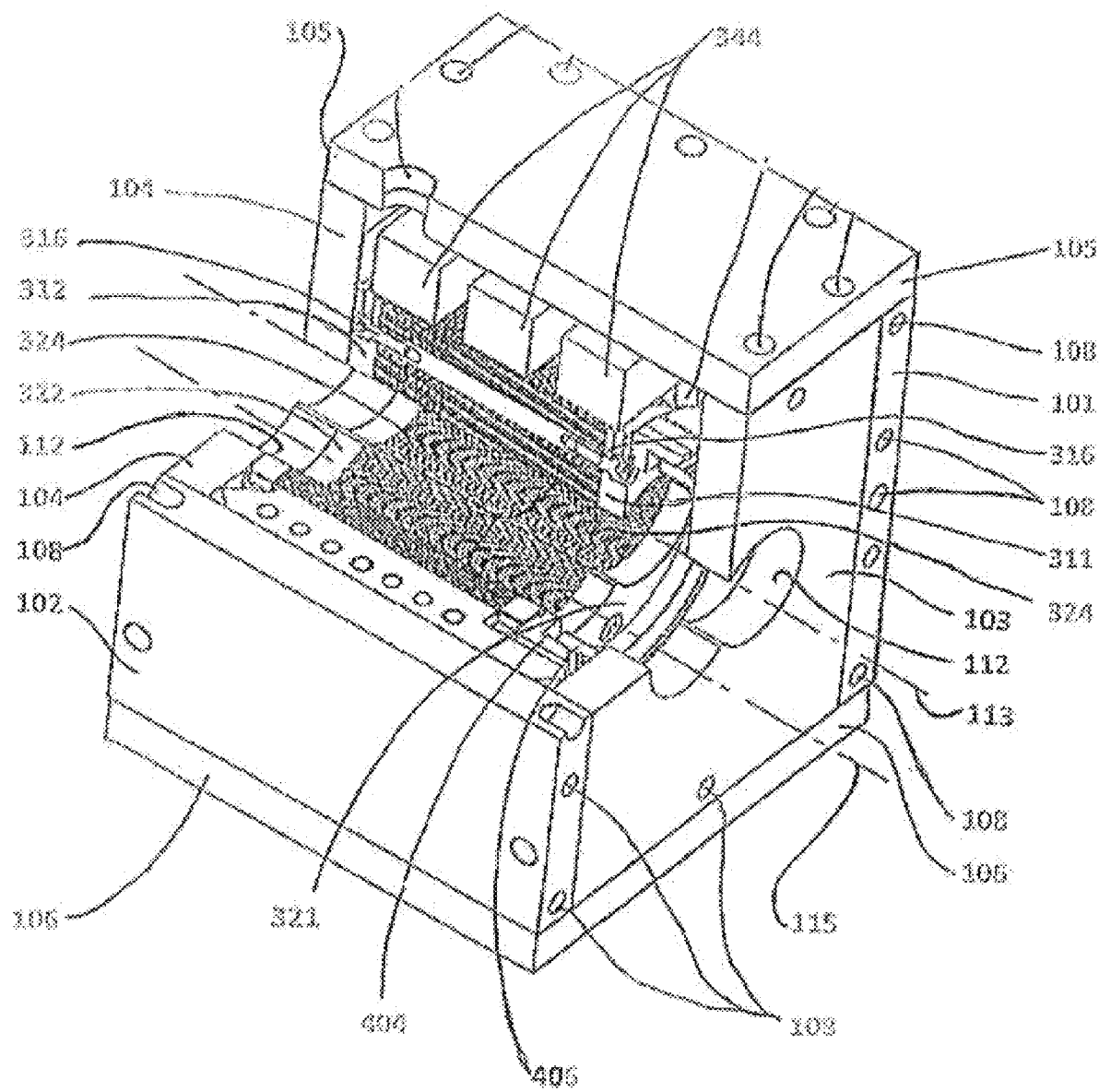
FIG. 23 is a partial cut-away view of the solid/fluid separation module of FIG. 21.
Figure 24:
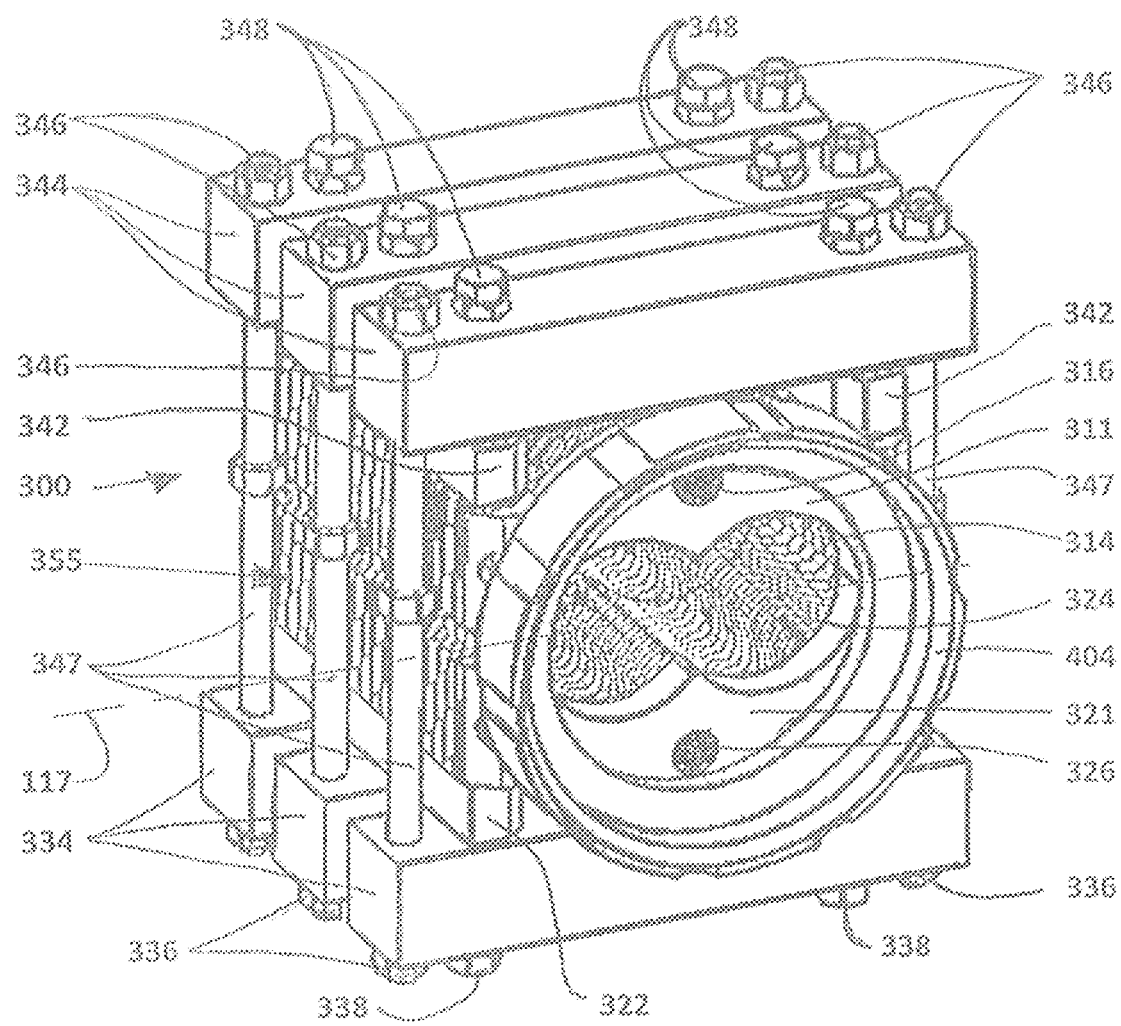
FIG. 24 is a perspective view of an exemplary split filter unit of the embodiment of FIG. 21.

A cross section through a split block filter unit 300 in accordance with the invention is illustrated in FIG. 20. As is apparent from FIG. 20, the end plate sections 311, 321, 312, 322, and universal barrel plates 370 are all aligned so that the core openings 112 align to form the core passage for receiving the conveyor screws. Moreover, the barrel plates which are constructed as universal filter plates 372 are stacked together against one of the end plates and aligned so that their drainage perforations 362 align to form collection chambers 338 that extend parallel to the axis of the core passage. Moreover, at least one of the end plate sections in each plate stack 310, 320 includes a drainage passage 363 connecting the collection chambers 338 with an exterior of the filter unit, for drainage from the collection chambers 338 of fluid separated through the filter passages 360. A separate drainage passage 363 may be provided for each collection chamber 338, or the drainage passage 363 can connect two or more collection chambers 338. When both end plate sections of a plate stack are provided with drainage passages 363, separated fluid can be circulated through the collection chambers in the plate stack to reduce the risk of fines accumulation. The outlet end 364 of the drainage passage 363 can be connected to source of pressurized backwash fluid, for example steam, for backwashing of the respectively connected collection chambers 338 and filter passages 360.

The principle construction of assembling a portion of the barrel from stacked identical barrel plates, which may be constructed as filter plates, allows for significant design variability and even enables the variation of the filtering or separation capacity and behavior of an extruder press by not only varying the filtering capacity of individual separating modules 600, but by converting separating modules 600 into barrel modules 212 by simply replacing the stacked blocks 310, 320 including one or more filtering plates with stacked blocks including only barrel plates and no filter plates, or even blocks of overall solid construction. In one possible embodiment, the complete barrel is constructed using separating modules, some of which have been converted to barrel modules 212 by replacement of the filter plates in the stacked blocks 310, 320 with barrel plates, In another embodiment, each separating module includes a solid filter block and a stacked filter block, whereby the solid block forms the upper filter block of the filter unit and the stacked block forms the lower filter block. It is a significant advantage of an arrangement in which each barrel module is a separating module in accordance with the invention that any part of the barrel can be used as a barrel section or as a filter unit and can be converted from one to the other without requiring disassembly of the barrel, by simply exchanging the filter blocks. Each of the filter blocks along the barrel can be a solid filter blocks, or a stacked block with a particularly selected porosity. Separation modules in which the upper and lower filter blocks are both solid blocks or stacked blocks devoid of any filter passage then function as a regular barrel module 212. Moreover, it is another significant advantage of such an arrangement that a blockage in any part of the barrel, whether in a separating/filtering region or not, can be cleared, without the need for disassembly of the extruder press or removal of the conveyor screws, by simply replacing the clogged filter block with a clean like filter block and/or removing the compacted solids surrounding the conveyor screws and blocking the core passage 112.

Overall, with higher pressure capability, either more liquid can be squeezed from the solids or, for the same material dryness, a higher production rate can be achieved per unit filtration area. The quality of filtration (solids capture) can be controlled depending on plate configurations and thicknesses. The filtration/pressure rating/capital cost can be optimized depending on the filtration requirements of the particular biomass. The plate configurations can be installed in an extruder (single, twin or triple screws) to develop high pressure, high throughput, continuous separation. The solid/fluid separation module can be constructed with sufficiently tight spacing between the conveyor screws themselves and between the conveyor screws and the inner edge to achieve a self-cleaning effect (for twin and triple screws) by a wiping action of the screws and by an cross axial flow pattern. The filtration area is flexible depending on process requirements as the length of plate pack can be easily custom fit for the particular requirements. The module can be used to wash solids in a co current or counter current configuration in single or multiple stages in one machine reducing capital cost and energy requirements. The pressure of the liquid filtrate can be controlled from vacuum conditions to even higher than the filter block internal pressure (2,000 to 3,000 psig), if required. This provides great process flexibility for further separations in the liquid stream (example super critical CO2 under high pressure, ammonia liquid used for washing under high pressure, or release of VOC and ammonia gases in the liquid filtrate chamber using vacuum).

In the exemplary solid/fluid separation device described, the screw elements that transfer the material internally in the separation device have very close tolerances to the internal surface of the filter block and continually scrape the material away from the filter surface. In the event that a small amount of fibers became trapped on the surface of the filter, they will be sheared by the extruder elements into smaller pieces and ultimately pass through the filter and out with the liquid stream. The high back pressure capability of the internal fluid collection chambers (higher than internal filter block pressure) can be used to back flush the filter during operation in case of plugging or scaling of the filter, minimizing down time. Of course, any plugging which cannot be cleared by backwashing can be removed by disassembly of only the filter unit 300 which is plugged, without removal of the whole separation module 600 from the separating apparatus 100 or removal of the extruder screws.

It will be readily understood that the solid/fluid separation module in accordance with the invention can be used in many different applications to separate solid/fluid portions of a solid/fluid mixture.

Different filter modules 600 have been made and tested. The pressure rating of the filter plates was somewhat independent of the filter porosity, the number and size of filter passages, and the number of drainage perforations. By moving the collection passages into the filter block, all filter plates include a continuous annulus which has the full plate thickness and is centered about the core opening. It is this annulus which provides the filter plates with their pressure resistance. Any differences in filter plate design, other than plate thickness, are found between the inner edge at the core opening and the annulus. Thus, the area of the annulus is fairly consistent for different filter plate designs, which is the reason for small variations in pressure resistance observed between filter modules of different design. One filter plate design tested had a thickness of 0.020", a filter passage width of 0.04". Different filter passage depths of 0.005", 0.010", 0.0075" and 0.015" were tested.

The total number of filter plates can vary depending on the type of solid/fluid mixture to be separated, for example biomass, and influences the overall filter area. For the same liquid separation conditions, more plates/more surface area is required for smaller pores. The size of the filter pores controls the amount of solids which pass to the liquid portion. Each solid/fluid mixture may require a certain pore size to achieve an optimal solids capture (amount of suspended solids in liquid filtrate). By using separation modules in accordance with the invention, the porosity, pore size and total filter area of the solid/fluid separation device can be varied and adjusted without disassembly of the device or removal of the conveyor screws, making it possible to adjust the separating properties of the separating device 'on the fly'.

Although this disclosure has described and illustrated by way of certain embodiments, it is also to be understood that the system, apparatus and method described is not restricted to these particular embodiments. Rather, it is understood that all embodiments, which are functional or mechanical equivalents of the specific embodiments and features that have been described and illustrated herein are included. It will be understood that, although various features have been described with respect to one or another of the embodiments, the various features and embodiments may be combined or used in conjunction with other features and embodiments as described and illustrated herein.

What is claimed is:

1. A solid/fluid separation module for a solid/fluid separating press, the press having a barrel with a core opening for containing a solid/fluid mixture and housing at least one conveyor screw for conveying the solid/fluid mixture, the barrel being divided into at least two barrel modules respectively defining an axial portion of the barrel, the solid/fluid separation module being constructed for forming at least one of the barrel modules and comprising a pair of mounting plates for connection to adjacent barrel modules and a filter unit fastened between the mounting plates, the filter unit formed by a plurality of barrel plates stacked one behind the other and sealingly compressed into a plate stack between a pair of end plates, each barrel plate having a front face and a back face and each mounting plate, end plate and barrel plate having a core opening equal in cross-section to the core passage;

at least one barrel plate adjacent one of the end plates being a perforated barrel plate having a drainage perforation separate from the core opening, the core opening and drainage perforation each extending from the front face to the back face, all mounting plates, end plates, barrel plates and perforated barrel plates in the separation module being oriented for the core openings to align and form the core passage of the filter unit and all perforated barrel plates being further aligned for the drainage perforations to align and form an internal fluid collection chamber within the filter unit;

at least one of the perforated barrel plates being constructed as a filter plate including at least one filter passage extending from the core opening to the drainage perforation and formed in a front and/or back face of the filter plate; and at least one of the end plates having an evacuation passage connected at an input end with the collection chamber and at an output end with an exterior of the filter unit for draining from the collection chamber separated fluids that were separated from the solid/fluid mixture through the filter passage and wherein optionally all barrel plates are perforated barrel plates and each end plate has an evacuation passage for the collection chamber to allow circulation of the separated fluids in the collection chamber for reducing deposits in the collection chamber.

2. The solid/fluid separation module of claim 1, wherein each perforated barrel plate includes at least two independent drainage perforations for the formation of an equal number of internal collection chambers within the plate stack and each filter plate includes at least one filter passage for each drainage perforation.

3. The solid/fluid separation module of claim 2, wherein at least one end plate includes a separate evacuation passage for each interior collection chamber and optionally each end plate includes a separate evacuation passage for each interior collection chamber to allow selected circulation of separated fluids through each collection chamber to reduce deposits in the collection chamber.

4. The solid/fluid separation module of claim 3, wherein each filter plate includes at least one filter passage for each drainage perforation.

5. The solid/fluid separation module of claim 1, connectable to a pressure input for selectively connecting the output end of each evacuation passage to a source of backpressure for reversing a flow of the separated fluids in the collection chamber and the filter passage to backwash the filter passage, wherein optionally each evacuation passage is individually connectable to the pressure input, or one, two or more of the evacuation passages are simultaneously connectable to the pressure input.

6. The solid/fluid separation module of claim 1, wherein the plate stack is divided into first and second plate stack sections joined along a longitudinal plane of symmetry of the core passage and sealably clamped together for defining the longitudinal portion of the core passage, at least one of the plate stack sections including a plurality of barrel plate sections stacked one behind the other and sealingly compressed into a plate stack section between the end plate sections.

7. The solid/fluid separation module of claim 6, further including a clamping structure for clamping together the first and second plate stack sections along the plane of symmetry and optionally for each plate stack section a stacking structure for aligning the barrel plate sections one behind the other in the plate stack and compressing the barrel plates into the plate stack for clamping together the barrel plate sections in each plate stack section.

8. The solid/fluid separation module of claim 1, for use with a separating press including two conveyor screws, wherein the plane of symmetry of the core passage extends through a longitudinal axis of each conveyor screw.

9. The solid/fluid separation module of claim 6, wherein the first plate stack section includes only barrel plates and the second plate stack section includes at least one filter plate and optionally the first plate stack section is replaced by a solid block.

10. The solid/fluid separation module of claim 6, wherein each plate stack section has a preselected filter pore size and a preselected porosity, each filter passage having an opening area at the inner edge corresponding to the preselected pore size and each filter plate having a filter plate porosity calculated from a total surface of the core opening, the preselected pore size and the number of filter passages, the plate stack section including a number of filter plates at least equal to the ratio of preselected porosity to plate porosity.

11. A solid/fluid separating press, comprising at least one conveyor screw for conveying a solid/fluid mixture and a barrel divided into at least two barrel modules respectively defining a longitudinal portion of a core passage for housing the at least one conveyor screw, at least one of the barrel modules constructed as a solid/fluid separation module including a pair of mounting plates for connection to adjacent barrel modules and a split filter unit fastened between the mounting plates;

the split filter unit including a plurality of barrel plates stacked one behind the other and sealingly compressed into a plate stack between a pair of end plates, each barrel plate having a front face and a back face and each mounting plate, end plate and barrel plate having a core opening equal in cross-section to the core passage, each end plate being divided along a plane of symmetry of the core passage into first and second end plate sections and each barrel plate being divided along the plane of symmetry into first and second split plates;

at least one split plate adjacent one of the end plate sections being a perforated split plate having a drainage perforation separate from the core opening, the drainage perforation extending from the front face to the back face, a stacking structure for aligning the first split plates into a first plate stack and the second split plates into a second plate stack, wherein the first and second split plates are stacked one behind the other in the first and second plate stack and compressed between the first and second end plate sections into first and second filter blocks respectively;

a clamping structure for clamping the first and second filter blocks together along the plane of symmetry to form the split filter unit;

all mounting plates, end plate sections, split plates and perforated split plates in the separation module being oriented for the core openings to align and form the core passage of the separation module and all perforated split plates being further aligned for the drainage perforations to align and form an internal fluid collection chamber within the respective first or second filter block;

at least one of the perforated split plates being constructed as a filter plate including at least one filter passage formed in a front and/or back face of the filter plate and extending from the core opening to the drainage perforation; and at least one of the end plate sections having an evacuation passage connected at an input end with the collection chamber and at an output end with an exterior of the split filter unit for draining from the collection chamber separated fluids that were separated from the solid/fluid mixture through the filter passage.

12. The solid/fluid separating press of claim 11, wherein each barrel module is a filter block.

13. The solid/fluid separating press of claim 11, wherein each split filter unit has a preselected pore size and each filter passage has an opening area at the inner edge corresponding to the preselected pore size and optionally each filter block has a preselected porosity calculated from a total surface of the portion of the core opening defined by the filter block, divided by the preselected pore size and the number of filter passages in the filter block.

14. A filter unit for use in a solid/fluid separating press having a core passage for containing a pressurized solid/fluid mixture, and housing at least one conveyor screw for conveying the solid/fluid mixture, the barrel being divided into at least two barrel modules respectively defining an axial portion of the barrel, the solid/fluid separation module being constructed for forming at least one of the barrel modules and including a pair of mounting plates for connection to adjacent barrel modules and the filter unit fastened between the mounting plates, the filter unit comprising a plurality of barrel plates stacked one behind the other and sealingly compressed into a plate stack between a pair of end plates, each barrel plate having a front face and a back face and each end plate and barrel plate having a core opening equal in cross-section to the core passage of the separating press;

at least one barrel plate adjacent one of the end plates being a perforated barrel plate having a drainage perforation separate from the core opening, the core opening and drainage perforation each extending from the front face to the back face, all end plates, barrel plates and perforated barrel plates in the filter unit being oriented for the core openings to align and form the core passage of the filter unit and all perforated barrel plates being further aligned for the drainage perforations to align and form an internal fluid collection chamber within the filter unit;

at least one of the perforated barrel plates being constructed as a filter plate including at least one filter passage formed in a front and/or back face of the filter plate and extending from the core opening to the drainage perforation; and at least one of the end plates having an evacuation passage connected at an input end with the collection chamber and at an output end with an exterior of the filter unit for draining from the collection chamber separated fluids that were separated from the solid/fluid mixture through the filter passage.

15. The filter unit of claim 14, wherein all barrel plates are perforated barrel plates and each end plate has an evacuation passage for the collection chamber to allow circulation of the separated fluids in the collection chamber for reducing deposits in the collection chamber, wherein optionally each perforated barrel plate includes at least two independent drainage perforations for the formation of an equal number of internal collection chambers within the plate stack and each filter plate includes at least one filter passage for each drainage perforation and optionally all barrel plates are perforated barrel plates including a number of drainage perforations distributed about the core opening for the formation of an equal number of separate interior collection chambers in the filter block.

16. The filter unit of claim 14, wherein there are at least two interior collection chambers and at least one end plate includes a separate evacuation passage for each interior collection chamber and optionally each end plate includes a separate evacuation passage for each interior collection chamber to allow selected circulation of separated fluids through each collection chamber to reduce deposits in the collection chamber.

17. The filter unit of claim 14, wherein each filter plate includes at least one filter passage for each drainage perforation.

18. The filter unit of claim 14, connectable to a pressure input for selectively connecting the output end of each evacuation passage to a source of backpressure for reversing a flow of the separated fluids in the collection chamber and the filter passage to backwash the filter passage and optionally each evacuation passage is individually connectable to the pressure input, or two or more of the evacuation passages are simultaneously connectable to the pressure input.

19. The filter unit of claim 14, wherein filter unit is a split filter unit divided into first and second filter blocks joined along a longitudinal plane of symmetry of the core passage and sealably clamped together for defining the longitudinal portion of the core passage, at least one of the filter blocks being a stacked filter block including a pair of end plate sections and a plurality of barrel plate sections stacked one behind the other and sealingly compressed into a plate stack section between the end plate sections and optionally further comprising a releasable clamping structure for releasably clamping together the first and second filter blocks along the plane of symmetry.

20. The filter unit of claim 19, wherein each stacked filter block further includes a stacking structure for aligning the barrel plate sections one behind the other in the plate stack section and for releasably compressing the barrel plate sections into the plate stack section.

21. The filter unit of claim 14, for use with a separating press including two conveyor screws, wherein the plane of symmetry of the core passage extends through a longitudinal axis of each conveyor screw.

22. The filter unit of claim 19, wherein there are two plate stack sections and the first plate stack section includes only barrel plates or a solid block and the second plate stack section includes at least one filter plate.

23. The filter unit of claim 14, wherein the plate stack has a preselected filter pore size and a preselected porosity, each filter passage having an opening area at the inner edge corresponding to the preselected pore size and each filter plate having a filter plate porosity calculated from a total surface of the core opening, the preselected pore size and the number of filter passages, the plate stack section including a number of filter plates at least equal to the ratio of preselected porosity to plate porosity.

\* \* \* \* \*